US010282079B2

(12) United States Patent
Shinomoto et al.

(10) Patent No.: US 10,282,079 B2
(45) Date of Patent: May 7, 2019

(54) CONTROL METHOD OF CONTROLLING A TERMINAL APPARATUS CONNECTED TO A COOKING DEVICE

(71) Applicant: Panasonic Intellectual Property Corporation of America, Torrance, CA (US)

(72) Inventors: Yuki Shinomoto, Tokyo (JP); Hiroyuki Kubotani, Hyogo (JP); Yasuhiro Yuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 407 days.

(21) Appl. No.: 15/003,296

(22) Filed: Jan. 21, 2016

(65) Prior Publication Data

US 2016/0139790 A1 May 19, 2016

Related U.S. Application Data

(63) Continuation of application No. PCT/JP2014/003982, filed on Jul. 30, 2014.

(30) Foreign Application Priority Data

Aug. 28, 2013 (JP) ................................ 2013-176795

(51) Int. Cl.
*H05B 6/00* (2006.01)
*H05B 1/02* (2006.01)
(Continued)

(52) U.S. Cl.
CPC .......... *G06F 3/04847* (2013.01); *F24C 7/085* (2013.01); *G06F 3/0482* (2013.01);
(Continued)

(58) Field of Classification Search
CPC .... H05B 6/64; H05B 1/02; H05B 6/00; G06F 17/30; G06F 17/00; G06F 3/048; G06Q 30/00
See application file for complete search history.

(56) References Cited

U.S. PATENT DOCUMENTS 6,064,050 A * 5/2000 Ishikawa .............. H05B 6/6435
177/245
9,349,128 B1 * 5/2016 Kerr .................... G06Q 30/0261
(Continued)

FOREIGN PATENT DOCUMENTS

JP 61-076825 4/1986
JP 2001-090953 4/2001
(Continued)

OTHER PUBLICATIONS

International Search Report of PCT application No. PCT/JP2014/003982 dated Oct. 28, 2014.

*Primary Examiner* — Hugo Molina
(74) *Attorney, Agent, or Firm* — Wenderoth, Lind & Ponack, L.L.P.

(57) ABSTRACT

Using a memory that manages a user log including at least a cooking time and a food to be cooked with a cooking device used by each user in a plurality of users, a recommended cooking time corresponding to a first user's food to be cooked included in recommended cooking times for respective foods calculated based on cooking times with the cooking devices is acquired from a server, a user interface that prompts the first user to select one of candidates of cooking times including at least the recommended cooking times is displayed on a display, and in response to detecting that a cooking time is selected by performing an input operation on the user interface, a setting command to set the selected cooking time is output to the first cooking device.

8 Claims, 16 Drawing Sheets

(51) Int. Cl.
  *G06F 17/30* (2006.01)
  *G06F 3/048* (2013.01)
  *G06F 3/0484* (2013.01)
  *H05B 6/64* (2006.01)
  *H05B 6/66* (2006.01)
  *F24C 7/08* (2006.01)
  *G06F 3/0481* (2013.01)
  *G06F 3/0482* (2013.01)
  *G06F 3/0488* (2013.01)
  *H04L 29/08* (2006.01)
  *H05B 6/80* (2006.01)

(52) U.S. Cl.
  CPC ........ *G06F 3/0488* (2013.01); *G06F 3/04817* (2013.01); *G06F 3/04842* (2013.01); *G06F 17/30864* (2013.01); *H04L 67/025* (2013.01); *H04L 67/125* (2013.01); *H05B 6/6435* (2013.01); *H05B 6/668* (2013.01); *H05B 6/80* (2013.01); *H05B 2206/04* (2013.01)

(56) References Cited

U.S. PATENT DOCUMENTS

| | | | | |
|---|---|---|---|---|
| 2001/0044759 | A1* | 11/2001 | Kutsumi | G06F 17/30699 705/26.7 |
| 2002/0052790 | A1* | 5/2002 | Tomishima | G06Q 10/02 705/15 |
| 2007/0007279 | A1* | 1/2007 | Chun | H05B 6/6441 219/506 |
| 2007/0214061 | A1* | 9/2007 | Toyokawa | G06Q 30/02 705/26.1 |
| 2010/0140248 | A1* | 6/2010 | Yi | F24C 7/087 219/391 |
| 2013/0264383 | A1* | 10/2013 | Ko | G06F 17/30 235/375 |
| 2015/0019987 | A1 | 1/2015 | Kouda et al. | |

FOREIGN PATENT DOCUMENTS

| | | |
|---|---|---|
| JP | 2001-336752 | 12/2001 |
| JP | 2006-153432 | 6/2006 |
| JP | 2006-250510 | 9/2006 |
| WO | 2013/128532 | 9/2013 |

\* cited by examiner

FIG. 3A

| BARCODE NUMBER | TRADE NAME | MANUFACTURER | AMOUNT | OUTPUT POWER | WARMING TIME |
|---|---|---|---|---|---|
| 49XXXXXXXXXXX | DEEP-FRIED | YY FROZEN FOOD | 1 | 600 W | 30 SECONDS |
| 49XXXXXXXXXXX | DEEP-FRIED | YY FROZEN FOOD | 2 | 600 W | 60 SECONDS |
| 49XXXXXXXXXXX | DEEP-FRIED | YY FROZEN FOOD | 1 | 500 W | 40 SECONDS |

FIG. 3B

| USER ID | AGE GROUP | GENDER | OCCUPATION | FAMILY STRUCTURE | AREA WHERE USER LIVES |
|---|---|---|---|---|---|
| User001 | 30's | FEMALE | COMPANY WORKER | LIVING WITH PARENTS | OSAKA PREFECTURE |
| User002 | 20's | MALE | COMPANY WORKER | LIVING ALONE | TOKYO |
| User003 | 40's | FEMALE | HOMEMAKER | LIVING WITH CHILDREN | AICHI PREFECTURE |

FIG. 3C

| USER ID | TIME | BARCODE NUMBER | AMOUNT | OUTPUT POWER | WARMING TIME |
|---|---|---|---|---|---|
| User001 | 07/01/2013 18:05:31 | 49XXXXXXXXXXX | 1 | 600 W | 30 SECONDS |
| User002 | 07/01/2013 18:10:03 | 49XXXXXXXXXXX | 2 | 600 W | 60 SECONDS |
| User001 | 07/02/2013 12:10:42 | 49XXXXXXXXXXX | 1 | 600 W | 35 SECONDS |
| User003 | 07/02/2013 22:30:17 | 49XXXXXXXXXXX | 2 | 700 W | 55 SECONDS |

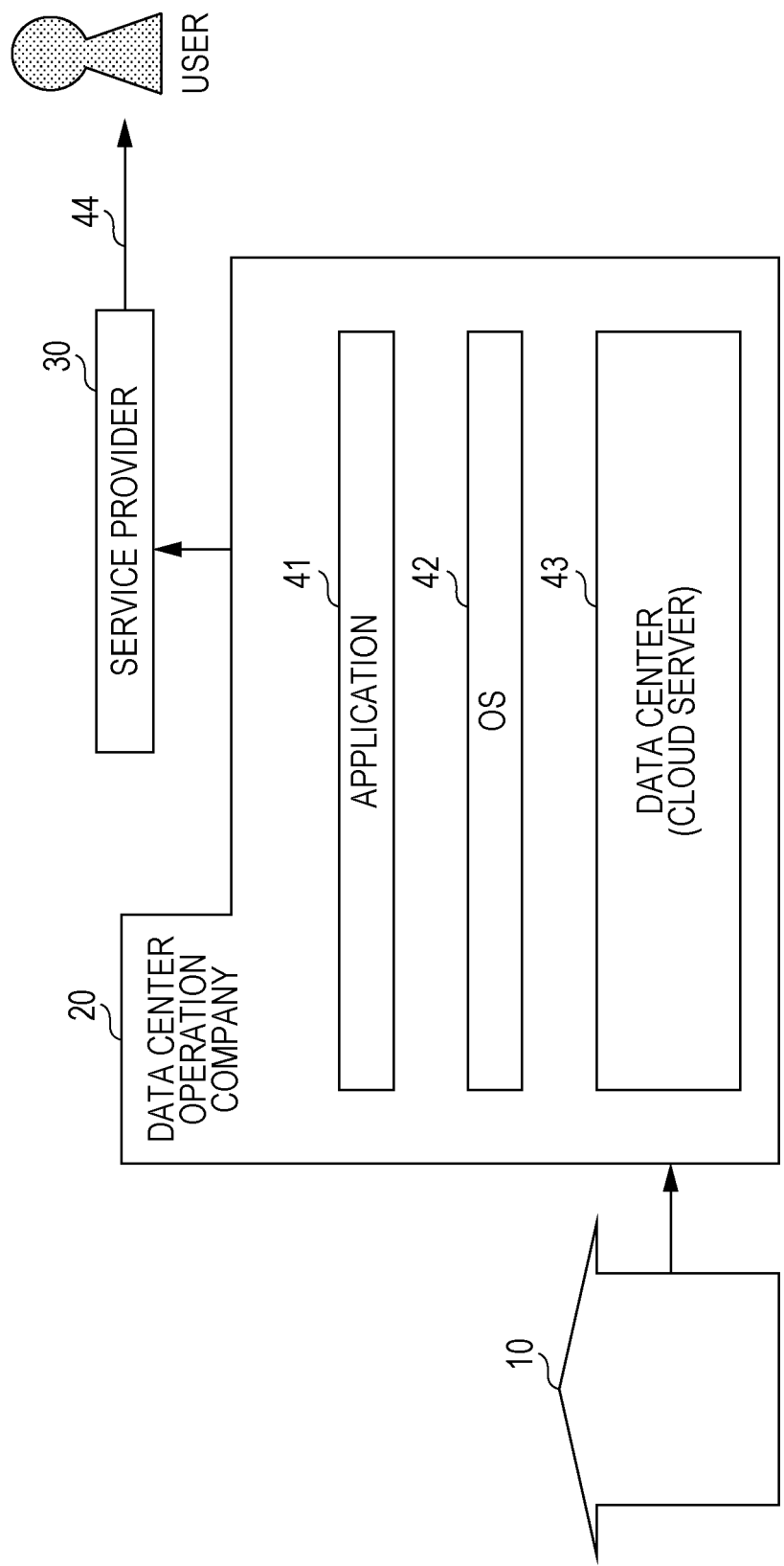

CONTROL METHOD OF CONTROLLING A TERMINAL APPARATUS CONNECTED TO A COOKING DEVICE

BACKGROUND

1. Technical Field

The present disclosure relates to a control method, a storage medium, and an information providing method in a terminal apparatus and an information providing system.

2. Description of the Related Art

A conventional method is known to download a cooking program to a cooking device (also referred to as a cooking apparatus) installed at a home via the Internet. For example, Japanese Unexamined Patent Application Publication No. 61-76825 discloses a method in which a cooking program code read from a barcode described on a package of a food is transferred to a microwave oven, and the microwave oven reads a cooking program corresponding to this cooking program code and sets a cooking time.

SUMMARY

In one general aspect, the techniques disclosed here feature that in a control method of controlling a terminal apparatus connected to a first cooking device in a plurality of cooking devices and including a touch-panel display, the control method includes controlling a computer in the terminal apparatus so as to perform by using a memory that manages a user log including at least a cooking time and a food to be cooked with a cooking device used by each user in a plurality of users, acquiring from a server a recommended cooking time corresponding to a first users food to be cooked from recommended cooking times for respective foods calculated based on cooking times of the cooking devices, displaying on the display a user interface that prompts the first user to select one of candidates of cooking times including at least the recommended cooking times, and in response to detecting that a cooking time is selected by performing an input operation on the user interface, outputting to the first cooking device a setting command to set the selected cooking time.

The present disclosure allows it to provide a cooking time for cooking a food to an optimum temperature without needing a user to perform setting of an additional cooking time.

It should be noted that general or specific embodiments may be implemented as a system, an apparatus, a method, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3A is a diagram illustrating an example of a database stored in a cloud according to an embodiment of the present disclosure;

FIG. 3B is a diagram illustrating an example of a database stored in a cloud according to an embodiment of the present disclosure;

FIG. 3C is a diagram illustrating an example of a database stored in a cloud according to an embodiment of the present disclosure;

FIG. 13 is a diagram illustrating an example a cloud service of model 4 according to an embodiment of the present disclosure.

DETAILED DESCRIPTION

Figure 1A:
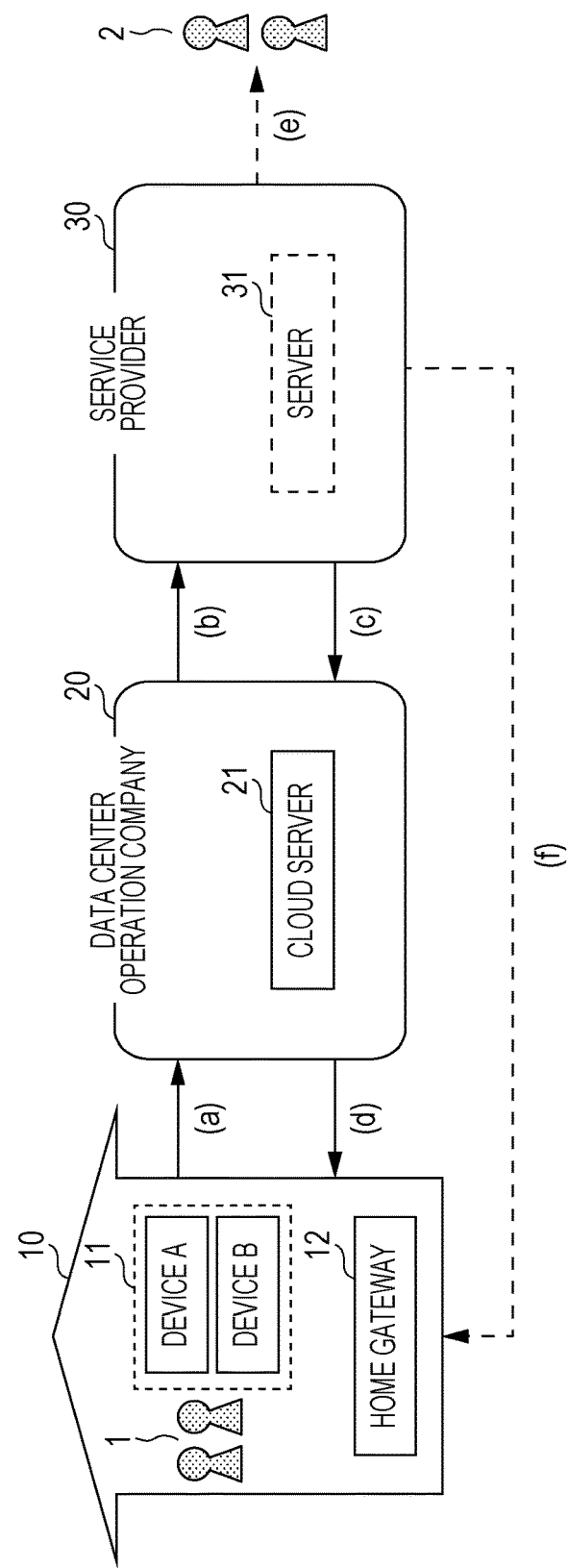
FIG. 1A is a diagram illustrating an example of an overall image of an information providing system according to an embodiment of the present disclosure.

First, a description is given below as to what has been investigated by the inventors to achieve various aspects of the present disclosure.

Underlying Knowledge Forming Basis of the Present Disclosure

When a food is cooked by heating it with a microwave oven, preferable warmth for the food varies depending on users.

However, conventionally, a cooking time determined by a cooking program has a value fixed depending on a food regardless of the user's preference.

In Japanese Unexamined Patent Application Publication No. 61-76825, a barcode described in a cookbook is read, and a corresponding cooking program is sent to main part of a microwave oven. However, nothing is taken into consideration in terms of the user's preference of warmth. Therefore, in a case where a barcode read from a cookbook is the same, the same cooking program is sent to the main part of the microwave oven regardless of the user's preference of warmth. Therefore, when the same food is cooked by being heated for a cooking time specified in the cooking program, resultant warmth of the food is always the same regardless of the preference of a user.

When some users are satisfied with particular warmness of a food, there may be other users who feel the warmness is too low or too high.

That is, in the conventional technique, the preference of warmth for a food is not taken into account when the food is cooked using the microwave oven. Therefore, users who like warmer foods are not satisfied with warmth obtained when foods are cooked by heating them using microwave ovens. In this case, additional heating is performed, that is, users have to perform additional heating many times.

The situation described above occurs not only when the microwave oven is used, but also occurs when other types of cooking devices (ovens) are used to perform heating to cook.

The present disclosure provides a control method that provides a cooking time adapted to a user's preference of warmth for a food in heating the food to cook it using a cooking device.

In an aspect, the present disclosure provides a control method of controlling a terminal apparatus connected to a first cooking device in a plurality of cooking devices and including a touch-panel display, the control method including controlling a computer in the terminal apparatus so as to perform by using a memory that manages a user log including at least a cooking time and a food to be cooked with a cooking device used by each user in a plurality of users, acquiring from a server a recommended cooking time corresponding to a first user's food to be cooked from recommended cooking times for respective foods calculated based on cooking times of the cooking devices, displaying on the display a user interface that prompts the first user to select one of candidates of cooking times including at least the recommended cooking times, and in response to detecting that a cooking time is selected by performing an input operation on the user interface, outputting to the first cooking device a setting command to set the selected cooking time.

The control method in this aspect makes it possible to set a cooking time to the first cooking device so as to achieve the first user's preference of warmth for a food when the food is heated using the cooking device.

In an aspect of the present disclosure, the control method further includes controlling the computer in the terminal apparatus so as to perform acquiring from the server a standard cooking time for the first user's food to be cooked, displaying the standard cooking time and the recommended cooking time on the display, and in response to detecting that either an icon corresponding to the standard cooking time or an icon corresponding to the recommended cooking time is selected, outputting to the first cooking device the setting command to set, as the selected cooking time, the cooking time corresponding to the selected icon.

This control method makes it possible for the first user to know the standard cooking time and the recommended cooking time. Furthermore, it is allowed to set a cooking time corresponding to a selected icon to the first cooking device.

In an aspect of the present disclosure, the control method further includes controlling the computer in the terminal apparatus so as to perform acquiring from the server a distribution of cooking times employed by the plurality of users for the first user's food to be cooked, displaying, on the display, the user interface including the distribution and a region of the recommended cooking time in the distribution, and in response to detecting that the region of the recommended cooking time in the distribution is selected, outputting to the first cooking device the setting command to set, as the selected cooking time, a cooking time based on a recommended cooking time corresponding to the selected region, The control method according to this aspect makes it possible for the first user to get to know the standard cooking time and the recommended cooking time based on the distribution. Furthermore, it is allowed to set a cooking time based on a recommended cooking time corresponding to a selected region to the first cooking device.

In the control method, in an aspect of the present disclosure, the user log further includes a description of a user ID of each user, and the server includes data stored therein describing a correspondence between the user ID and an age group for each user, wherein the control method includes controlling a computer in the terminal apparatus so as to perform acquiring from the server the recommended cooking time corresponding to the first user's food to be cooked and corresponding to an age group related to a user ID of the first user from recommended cooking times for respective foods for respective age groups obtained based on cooking times with cooking devices recorded in the user log from the plurality of users, acquiring recommended cooking times, for the first user's food to be cooked, recommended for respective age groups of the plurality of users, displaying on the display the user interface including the recommended cooking times for the respective age groups and a region of the recommended cooking time for an age group to which the first user belongs, and in response to detecting that a region of a recommended cooking time for a particular age group is selected, outputting to the first cooking device the setting command to set, as the selected cooking time, a cooking time based on a recommended cooking time corresponding to the selected region.

The control method according to this aspect makes it possible for the first user to get to know recommended cooking times for respective age groups and a region of a recommended cooking time for an age group to which the first user belongs.

In a control method in an aspect of the present disclosure, the recommended cooking time is an average value of cooking times for the same food described in the user logs given from the plurality of users.

In a control method according to an aspect of the present disclosure, the user log further includes a description of a user ID of each user, and the server includes data stored therein describing a correspondence between the user ID and an age group for each user, and the recommended cooking time is an average value of cooking times for the same food for the respective age groups described in the user logs given from the plurality of users.

In an aspect, the present disclosure provides a non-transitory storage medium storing a program of controlling a terminal apparatus connected to a first cooking device in a plurality of cooking devices and including a touch-panel display, the program including controlling a computer in the terminal apparatus to execute a process including using a memory that manages a user log including at least a cooking time and a food to be cooked with a cooking device used by each user in a plurality of users, acquiring from a server a recommended cooking time corresponding to a first user's food to be cooked from recommended cooking times for respective foods calculated based on cooking times of the cooking devices, displaying on the display a user interface that prompts the first user to select one of candidates of cooking times including at least the recommended cooking times, and in response to detecting that a cooking time is selected by performing an input operation on the user interface, outputting to the first cooking device a setting command to set the selected cooking time.

The program according to this aspect makes it possible to set a cooking time to the first cooking device used by the first user so as to achieve the first user's preference of warmth for a food when the food is heated using the cooking device.

In an aspect, the present disclosure presents a terminal apparatus connected to a first cooking device in a plurality of cooking devices and including a touch-panel display, including an acquisition unit that, using a memory that manages a user log including at least a cooking time and a food to be cooked with a cooking device used by each user in a plurality of users, acquires from a server a recommended cooking time corresponding to a first user's food to be cooked from recommended cooking times for respective foods calculated based on cooking times with the cooking devices, a display unit that displays on the display a user interface that prompts the first user to select one of candidates of cooking times including at least the recommended cooking times, and a setting unit that, in response to detecting that a cooking time is selected by performing an input operation on the user interface, outputs to the first cooking device a setting command to set the selected cooking time.

The terminal apparatus in this aspect makes it possible to set a cooking time to the first cooking device used by the first user so as to achieve first user's preference of warmth for a food when the food is heated using the cooking device.

In an aspect of the present disclosure, the terminal apparatus including the display is connected to the first cooking device via a network.

The terminal apparatus in this aspect is capable of setting via a network a cooking time to the first cooking device used by the first user so as to achieve the first user's preference of warmth for a food when the food is heated using the first cooking device.

In an aspect, the present disclosure provides an information providing method in an information providing system that is connected via a network to a plurality of terminal apparatuses connected to different cooking devices so as to be capable of communicating with each other and that manages information on the plurality of cooking devices, the method including receiving, from the respective terminal apparatuses, user logs including at least a cooking time and a food subjected to cooking with a cooking device used by a user, calculating recommended cooking times for respective foods based on cooking times associated with cooking devices included in the respective received user logs, and store the recommended cooking times for the respective foods in a memory, searching the memory to retrieve a recommended cooking time that corresponds to a first users food to be cooked and that has been received from a terminal apparatus used by the first user, and transmitting the recommended cooking time to the terminal apparatus, and displaying on a touch-panel display a user interface that prompts the first user to select one of candidates of cooking times including at least the recommended cooking times.

The information providing method in this aspect is capable of providing, to the terminal apparatus used by the first user, a cooking time that allows it to achieve the first user's preference of warmth for a food when the food is heated using the first cooking device. Thus, the terminal apparatus is capable of setting the cooking time to the first cooking device used by the first user so as to achieve the first user's preference of warmth for the food when the food is heated using the first cooking device.

Note that each embodiment described below is for illustrating a specific example of the present disclosure. In the following embodiments, values, shapes, constituent elements, steps, the order of steps, and the like are described as examples for illustration but not limiting the scope of the present disclosure. Among constituent elements described in the following embodiments, those constituent elements that are not described in independent claims indicating highest-level concepts of the present disclosure are arbitrary constituent elements. Note that elements or steps of any different embodiments may be combined.

Overall Image of Service Provided

FIG. 1A is a diagram illustrating an example of an overall image of an information providing system according to an embodiment of the present disclosure.

A group 10 is, for example, a company, an organization, a home, or the like. Note that there is no restriction on the scale thereof. The group 10 includes a device A and a device B which are devices in a plurality of devices 11, and a home gateway 12.

Furthermore, although not illustrated in FIG. 1A, groups different from the group 10 may each also include a plurality of devices and a home gateway as with the group 10. Hereinafter, a description is given as to the group 10. Note that the groups different from the group 10 are similar to the group 10, although a further description thereof is omitted. As one of devices in the plurality of devices 11 in the group 10, there is a device A (for example, a smartphone, a PC, a TV set, or the like) capable of being connected to, for example, the Internet. As another one of devices in the plurality of devices 11, there is a device B (for example, a microwave oven, a lighting device, a washing machine, a refrigerator, or the like) that is not capable of being directly connected to the Internet.

The device 11 (in particular, the device A), the home gateway 12, and the cloud server 21 are connected to each other via the Internet so as to be capable of communicating with each other. The device A, the device B, and the home gateway 12 are connected to each other via, for example, a network in a home of a user 1 so as to be capable of communicating with each other. The in-home network may be a wireless network or a wired network. Although the device B is a device that is not connectable to the Internet, the device B is connected to the home gateway 12 or the device A (for example, a smartphone) via, for example, an in-home network so as to be capable of communicating with each other. By connecting to the home gateway 12 or the device A via the in-home network, it becomes possible for the device B to connect to the Internet via the device A or the home gateway 12. The device A and the home gateway 12 are connected to the cloud server 21 via the Internet so as to be capable of communicating with each other. Therefore, the device B is connected to the cloud server 21 via the device A or the home gateway 12 so as to be capable of communicating with each other. Therefore, regardless of whether the device 11 is the device A or the device B, the device 11 is capable of connecting to the cloud server 21 via the Internet so as to be capable of communicating with each other. In the group 10, there are users 1 which are users using the plurality of devices 11.

The data center operation company 20 includes a cloud server 21. The cloud server 21 is a virtual server that cooperates with various devices via the Internet. The main role of the cloud server 21 is to manage big data or the like that is difficult to deal with by an average database management tool or the like. The data center operation company 20 manages data or manages the cloud server 21 or operates a data center that manages data or manages the cloud server 21. The details of the role of the data center operation company 20 will be described later. Herein the data center operation company 20 is not limited to a company that only manages data or operates the cloud server 21.

Figure 1B:
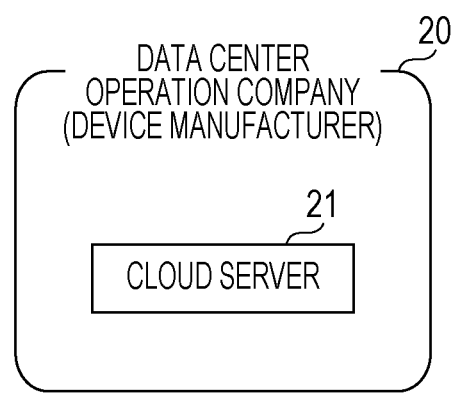
FIG. 1B is a diagram illustrating an example of a relationship between a data center operation company and a device manufacturer in an information providing system according to an embodiment of the present disclosure.
Figure 1C:
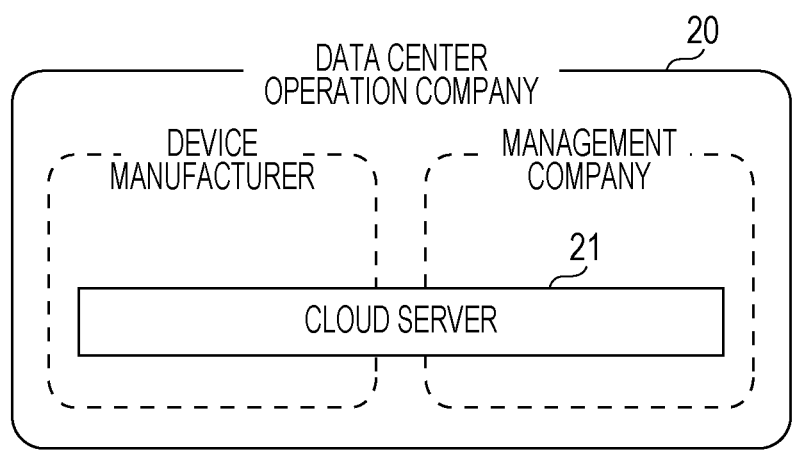
FIG. 1C is a diagram illustrating an example of a relationship among a data center operation company, a device manufacturer, and a management company in an information providing system according to an embodiment of the present disclosure.

FIG. 1B is a diagram illustrating an example of a relationship between a data center operation company and a device manufacturer in an information providing system according to an embodiment of the present disclosure. For example, in a case where a device manufacturer, which develops and produces one of the plurality of devices 11, also manages data or manages the cloud server 21, the device manufacturer functions as the data center operation company 20. Furthermore, the number of data center operation companies 20 is not limited to one. FIG. 1C is a diagram illustrating an example of a relationship among a data center operation company, a device manufacturer, and a management company in an information providing system according to an embodiment of the present disclosure. For example, in a case where a device manufacturer and another management company cooperatively or collaborately manage data or operate the cloud server 21, both or one of the device manufacturer and the management company functions as the data center operation company 20.

The service provider 30 includes a server 31. Herein there is no restriction on the scale of the server 31, and the server 31 may include a memory or the like, for example, in a personal computer. Note that the service provider 30 may not include the server 31.

Note that for the service described above, the home gateway 12 is not indispensable. For example, in a case where the cloud server 21 manages all data, the home gateway 12 is not necessary. Note that there is a possibility that there is no device that is not capable of being directly connected to the Internet as in a case where all devices at a home are connected to the Internet.

Next, a flow of information in the service is described.

First, the device A or the device B in the group 10 transmits each piece of log information to the cloud server 21 in the data center operation company 20. The cloud server 21 collects the log information associated with the device A or the device B ((a) of FIG. 1A). Here, the log information is information representing, for example, an operating situation and an operation date/time of the plurality of devices 11. Examples of log information include a television view history, video recorder timer information, a washing machine operation date/time, an amount of laundry, an opening/closing date/time of a refrigerator, the number of times a refrigerator is opened/closed, and the like. The log information is not limited to those described above, but any information that can be acquired from any device may be log information. The log information may be provided directly from the plurality of devices 11 themselves to the cloud server 21 via the Internet. Alternatively, log information from the plurality of devices 11 may be collected once in the home gateway 12 and then the long information may be provided to the cloud server 21 from the home gateway 12.

Alternatively, log information from the plurality of devices 11 may be collected once in another device that is capable of being connected to the Internet, and then the long information may be provided to the cloud server 21 from this device.

Next, the cloud server 21 of the data center operation company 20 provides the collected log information in fixed units to the service provider 30. Herein, the fixed unit may be a unit in which the data center operation company is allowed to rearrange and provide the collected information to the service provider 30, or the fixed unit may a unit requested by the service provider 30. Although the unit is assumed to be fixed in the above description, the amount of information provided may be variable depending on the situation. The log information is stored as required in the server 31 disposed in the service provider 30 ((b) of FIG. 1A). The service provider 30 then arranges the log information into information adapted to a service to be provided to a user, and provides it to the user. The service may be provided to the users 1 using the plurality of devices 11 or an external user 2. A method of providing service to users may be, for example, to provide the service to the users from the service provider via the Internet ((e) and (f) of FIG. 1A). Alternatively, service may be provided to users, for example, after being again passed through the cloud server 21 of the data center operation company 20 ((c), (d) in FIG. 1A). Alternatively, the cloud server 21 of the data center operation company 20 may arrange the log information into information adapted to the service to be provided to a user and may provide the arranged information to the service provider 30.

Note that the users 1 may be or may not be the same of users 2.

Embodiments

Configuration of Information Providing System

Figure 2:
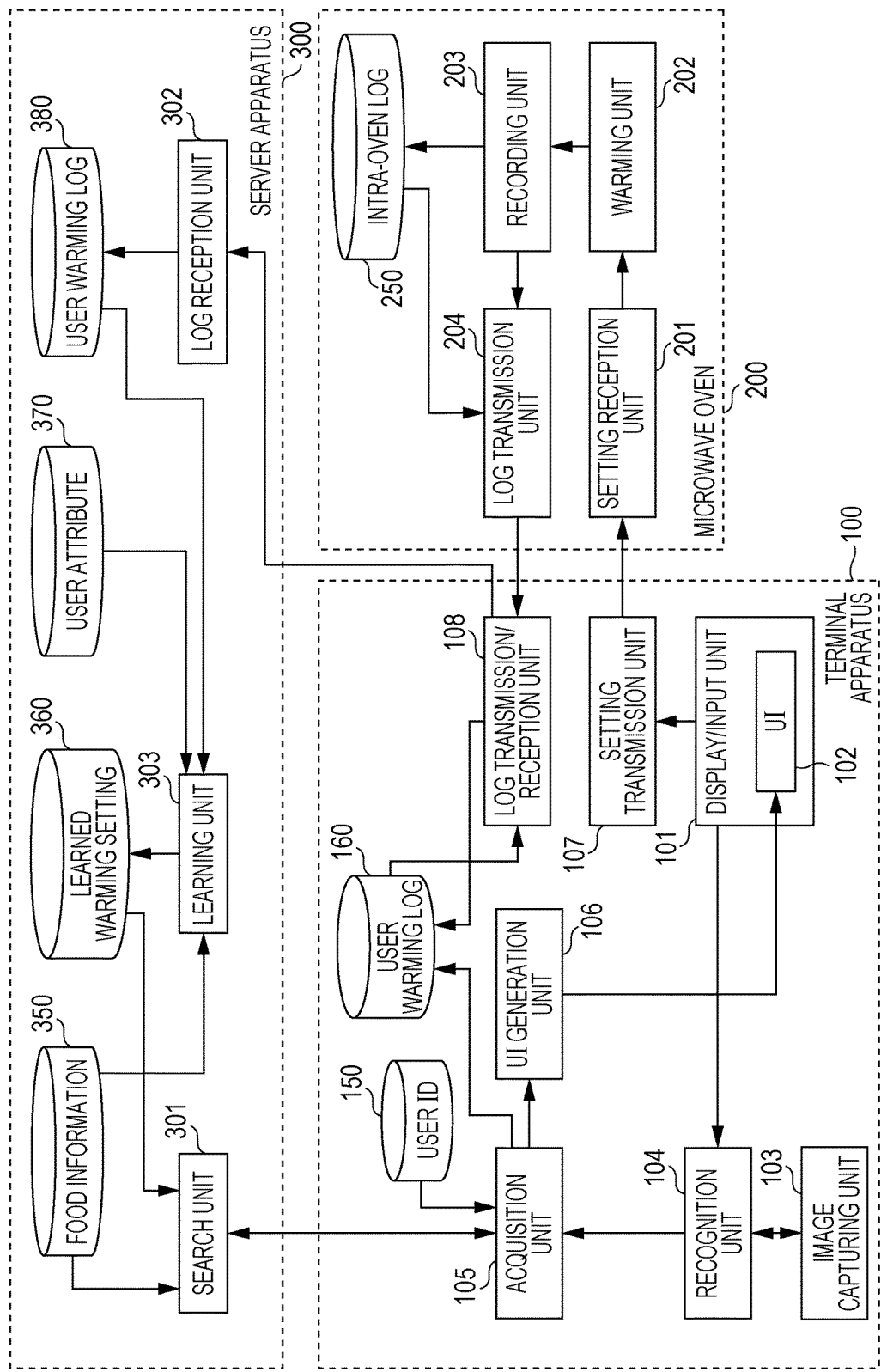
FIG. 2 is a block diagram illustrating an example of a configuration of an information providing system according to an embodiment of the present disclosure.

FIG. 2 is a block diagram illustrating an example of a configuration of an information providing system according to an embodiment of the present disclosure. The information providing system illustrated in FIG. 2 includes a terminal apparatus 100 functioning as a first terminal apparatus that presents a recommended cooking program (cooking setting) to a user, a microwave oven 200 functioning as a first cooking device (a first microwave oven), and a server apparatus 300. The server apparatus 300 stores the recommended cooking program. In FIG. 2, the terminal apparatus 100 is an example of a device 11 in the group 10 illustrated in FIG. 1A. More specifically, the terminal apparatus 100 may be, for example, the device A (for example, a smartphone) connectable to the Internet illustrated in FIG. 1A. The microwave oven 200 may be, for example, the device B unconnectable to the Internet illustrated in FIG. 1A. The microwave oven 200 is connected, for example, to the device A or the home gateway shown in FIG. 1A via an in-home network so as to be capable of communicating with each other. The server apparatus 300 functions as the cloud server 21 or the server 31 shown in FIG. 1. Although not shown in FIG. 2, one or more microwave ovens different from the microwave oven 200 are connected to the server apparatus 300 via the Internet so as to be capable of communicating with each other.

Hereinafter, the microwave oven different from the microwave oven 200 is referred to as a second microwave oven (a second cooking device). The terminal apparatus 100 may be, for example, the device A in the group 10 shown in FIG. 1A. The second microwave oven may be, for example, the device B in the group 10 shown in FIG. 1A. In this case, the second microwave oven is connected to the device A or the home gateway in the group 10 via an in-home network so as to be capable of communicating with each other. Alternatively, the second microwave oven may be, for example, a device A of a group different from the group 10 shown in FIG. 1A. Alternatively, the second microwave oven may be, for example, a device B of a group different from the group 10 shown in FIG. 1A. In this case, the second microwave oven is connected to a device A (for example, a second terminal apparatus) or a home gateway of a group different from the group 10 via an in-home network of a group different from the group 10 so as to be capable of communicating with each other. The second microwave oven has a similar configuration to that of the microwave oven 200 described later, and thus a detailed description thereof is omitted here.

In the following explanation, it is assumed by way of example that an oven function (a warming process) is used as a cooking function of the microwave oven 200. A cooking program transmitted from the server apparatus 300 to the terminal apparatus 100 includes a setting of a cooking time (a warming time) to be set in the microwave oven 200. Note that the cooking function of the microwave oven 200 is not limited to the oven function, but the present embodiment may be applied to other functions such as an oven, grill, or steam function.

Configuration of Terminal Apparatus 100

In the terminal apparatus 100, the display/input unit 101 displays, on a touch-panel display or the like, a UI (User Interface) 102 for presenting information to a user and for accepting various operations performed by the user. More specifically, the display/input unit 101 displays the UI 102 that prompts a user to select one from candidates of warming times including at least a recommended warming time (a recommended cooking time) corresponding to a food to be warmed (to be cooked) by the microwave oven 200. Furthermore, in response to accepting a physical operation (for example, a touch operation on a touch panel) by a user, the display/input unit 101 performs various processes and outputs results of the processes to the UI 102 and the recognition unit 104. For example, the display/input unit 101 notifies the recognition unit 104 of accepting an input operation performed by a user to request for starting a barcode recognition. Furthermore, the display/input unit 101 outputs a warming setting input via the UI 102 (a warming setting selected by a user) to the setting transmission unit 107. For example, the display/input unit 101 is a touch panel or the like. A detailed description of the UI 102 will be given later.

The image capture unit 103 acquires image data by taking an image including a food or a package of a food and outputs the image data to the recognition unit 104. For example, the image capture unit 103 acquires image data including a barcode described on a package of a food.

The recognition unit 104 analyzes the image data received from the image capture unit 103 and recognizes the food in the image taken by the image capture unit 103. For example, when the recognition unit 104 receives image data including a barcode, the recognition unit 104 analyzes the image data of the barcode and converts it into a numeral (a barcode number) corresponding to the barcode. Note that a conventional image analysis method may be used to recognize the barcode. The recognition unit 104 outputs the obtained information (for example, the barcode number) to the acquisition unit 105. Note that the barcode is an example of information used in recognizing the food, and the information is not limited to barcodes. For example, the recognition unit 104 may uniquely identify a food based on an image of the food itself or an image of an overall package of the food.

The acquisition unit 105 requests the server apparatus 300 (the search unit 301) to provide a recommended warming setting using, as a key, the information (for example, the barcode number) or the user ID 150 received from the recognition unit 104. More specifically, the acquisition unit 105 acquires, from the server apparatus 300, a recommended cooking time corresponding to a to-be-warmed food of a user with a user ID 150, retrieved from recommended warming times of respective foods obtained based on warming times by the microwave oven 200 recorded in user warming logs 380 (described later) associated with a plurality of users including the user with the user ID 150. The acquisition unit 105 then outputs the recommended warming setting received, in response to the request, from the server apparatus 300 to the UI generation unit 106.

The acquisition unit 105 also requests the server apparatus 300 (the search unit 301 described later) to provide food information (that is, food information corresponding to the barcode number, as will be described later) corresponding to a key indicating the information (for example, the barcode number) received from the recognition unit 104. The acquisition unit 105 then outputs the food information received, in response to the request, from the server apparatus 300 to the UI generation unit 106. The acquisition unit 105 stores the user ID 150 and the acquired food information as the user warming log 160 in an internal memory.

Herein the "food information" includes, for example, a barcode number, an amount of food, a standard warming output power (watt), a standard warming time, and the like. The standard warming output power corresponds to an output power of a microwave oven (watt) to be set to warm the food corresponding to the barcode number. The standard warming time corresponds to, for example, a warming time (a cooking time) to be spent to achieve the standard warmth for the food when the food is warmed with the standard warming output power. The "recommended warming setting" includes a warming time (a cooking time) for the food determined taking into account a preference of a user. For example, the recommended warming setting indicates a warming time (a recommended warming time) adapted to a user's preference rather than the standard warming time for the food, or an increase/reduction ratio of the recommended warming time to the standard warming time for the food.

The UI generation unit 106 generates the UI 102 using the food information (for example, the standard warming time) and the recommended warming setting (the recommended warming time) received from the acquisition unit 105. For example, the UI generation unit 106 generates the UI 102 that prompts a user to select the standard warming time indicated in the food information and a warming time (a recommended warming time) learned using the user warming log 160. The UI generation unit 106 outputs the generated UI 102 to the display/input unit 101.

Furthermore, in a case where the UI generation unit 106 receives from, for example, the log transmission/reception unit 108 a notification that a warming process by the microwave oven 200 is completed (not illustrated), the UI generation unit 106 generates a UI that prompts a user to select whether to perform, in addition to the warming process, an additional warming process.

The setting transmission unit 107 outputs, to a network connected to the microwave oven 200, a setting command for controlling the microwave oven 200 (the setting reception unit 201 described later) to perform the warming setting selected via the UI 102. Thus the setting command is transmitted to the microwave oven 200 via the network, and the warming time selected via a user's input operation on the UI 102 is set to the microwave oven 200. The warming setting includes information associated with, for example, the warming output power (an amount of watt) and the warming time (the cooking time). If the user presses a button (not illustrated) for controlling the microwave oven 200, to which the warming setting has been set, to perform a warming process, then the warming process is performed. Note that the setting command may include a command instructing to execute the warming process. This makes it possible for the terminal apparatus 100 to remotely control the microwave oven 200 in terms of the warming setting and the warming process. Note that communication between the terminal apparatus 100 and the microwave oven 200 is performed via wireless communication path (or network) such as NFC (NearField Communication), Wi-Fi (registered trademark), or Bluetooth (registered trademark).

Alternatively, the communication between terminal apparatus 100 and the microwave oven 200 may be performed via, for example, a wired communication line (or network).

When the log transmission/reception unit 108 receives a notification of completion of the warming process and an intra-oven log 250 from the microwave oven 200 (the log transmission unit 204), the log transmission/reception unit 108 outputs the notification to the UI generation unit 106. The database stored in the database of the user warming log 160 in which the contents of the intra-oven log 250 are stored is managed in a memory disposed in the terminal apparatus 100. The memory is, for example, either a RAM or a hard disk or a combination thereof. In response to the reception, the log transmission/reception unit 108 transmits the user warming log 160 to the server apparatus 300 (a log reception unit 302 described later). Note that communication between the terminal apparatus 100 and the server apparatus 300 is performed, for example, via the Internet.

The user ID 150 is an ID uniquely identifying a user and is stored in the memory (the storage unit) of the terminal apparatus 100. The memory is, for example, either a RAM or a hard disk or a combination thereof. Note that a database in which the user ID 150 and the user warming log 160 are stored is managed in one or more memories in the terminal apparatus 100. The user ID 150 is used as a key used by the server apparatus 300 to acquire a user attribute or as a key used in acquiring a recommended warming time for the microwave oven 200. For example, the terminal apparatus 100 may acquire the user ID 150 by prompting the user to input the user ID via the UI 120. Furthermore, attribute information indicating an age, a gender, and the like of the user may be input via the UI 120 and stored in the internal memory (the storage unit) in relation to the user ID 150.

Alternatively, image data including a part (a face, a fingerprint, a pupil and/or the like) or all of a body of a user may be stored in relation to the user ID 150 in the internal memory of the terminal apparatus 100. In this case, the image data including a part or all of the body of the user is stored in relation to the user ID 150 in the internal memory of the terminal apparatus 100. Thereafter, an image of a part of all of the body is taken, for example, using the image capture unit 103 of the terminal apparatus 100, and the acquisition unit 105 detects, from the internal memory, user's image data being equal to or having high similarity with the captured user's image data, and acquire a user ID 150 related to the detected user's image data. The acquired user ID 150 may be used in the server apparatus 300 as a key for use in retrieving a user attribute or may be used as a key for use in retrieving a recommended warming time for the microwave oven 200. This makes it possible to easily identify each user even in a case where the microwave oven 200 is used by a plurality of users.

The terminal apparatus 100 may include an image analysis unit (not illustrated) that analyzes the image data including a face of a user to presume the age and the gender of the user. In this case, if image data of a user related to a user ID includes a face of the user, the age and the gender of the user may be presumed by analyzing the image data using the image analysis unit, and the presumed age and gender may be stored as attribute information in relation to the user ID.

Alternatively, voice data of a user may be stored in relation to the user ID 150 in the internal memory of the terminal apparatus 100. In this case, after the voice data of the user is stored in relation to the user ID 150 in the internal memory of the terminal apparatus 100, a voice of a user may be recorded using a voice sensing unit such as a microphone (not illustrated) provided on the terminal apparatus 100, and the acquisition unit 105 may detect, from the internal memory, voice data of a user being equal to or having high similarity to the recorded voice data of the user and may further acquire a user ID 150 related to the detected voice data of the user. The acquired user ID 150 may be used as a key used by the server apparatus 300 to acquire a user attribute or as a key used in acquiring a recommended warming time for the microwave oven 200. This makes it possible to easily identify each user even in a case where the microwave oven 200 is used by a plurality of users.

The terminal apparatus 100 may include a voice analysis unit (not illustrated) that analyzes the voice data including a voice of a user to presume the age and the gender of the user. In this case, the age and the gender of the user may be presumed by analyzing the voice data of the user related to the user ID using the image analysis unit, and presumed age and gender may be stored as attribute information in relation to the user ID.

The user warming log 160 is a log in which at least a warming time (a cooking time) employed by a user corresponding to a user ID 150 in warming using the microwave oven 200 and a food subjected to the warming (cooking) are recorded. For example, the user warming log 160 is a log including a description of which user warms what amount of which food to what degree (with what power and for how long a time). The user warming log 160 is stored in the internal memory (the storage unit) of the terminal apparatus 100. For example, the user warming log 160 describes a user ID, a warming start time, food information of a food to be warmed (for example, a barcode number), an amount of food, a warming output power, and a warming time. In this case, in the user warming log 160, the user ID 150 and the food information (the barcode number, an amount) from the acquisition unit 105 and the intra-oven log 250 (the warming start time, the warming output power, and the warming time) from the log transmission/reception unit 108 are combined in one set of data and stored.

Configuration of Microwave Oven 200

In the microwave oven 200, the setting reception unit 201 receives a warming setting from the terminal apparatus 100 (the setting transmission unit 107). The setting reception unit 201 sends, to a warming unit 202, a command based on the content represented in the received warming setting.

The warming unit 202 performs a warming process according to the warming setting received from the setting reception unit 201. For example, to perform the process by the warming unit 202, an apparatus similar to an ordinary microwave oven including a magnetron or the like may be used.

A recording unit 203 records, in the intra-oven log 250, a content corresponding to the warming process performed by the warming unit 202. The recording unit 203 notifies the log transmission unit 204 that the log has been recorded in the intra-oven log 250 and the warming process by the warming unit 202 has been completed.

In response to receiving the notification from the recording unit 203 that the log has been recorded in the intra-oven log 250, the log transmission unit 204 transmits the intra-oven log 250 to the terminal apparatus 100 (the log transmission/reception unit 108). Furthermore, in response to receiving the notification that the warming process has been completed, the log transmission unit 204 transmits a notification of completion of the warming process to the terminal apparatus 100 (the log transmission/reception unit 108).

The intra-oven log 250 is a log describing when and how (in terms of watt, the time, and the like) warming is performed by the microwave oven 200. The intra-oven log 250 is stored, for example, in a memory (a storage unit) disposed in the microwave oven 200.

Note that the intra-oven log 250 transmitted by the log transmission unit 204 may include attribute information of the microwave oven 200. The attribute information of the microwave oven may be information indicating, for example, a model number of the microwave oven, a manufacturer that produced the microwave oven, or the like.

Configuration of Server Apparatus 300

In the server apparatus 300, the search unit 301 searches the database of the learned warming setting 360 using, as the key, the information (the barcode number) or the user ID received from the terminal apparatus 100 (the acquisition unit 105) thereby acquiring a learned warming setting corresponding to the key as a recommended warming setting. That is, the search unit 301 reads out the recommended warming time (the recommended warming setting) corresponding to the user's food (the barcode number) received from the terminal apparatus 100, from the memory (the database of the learned warming setting 360) in which recommended warming times for respective foods are stored). Furthermore, the search unit 301 searches the database of the food information 350 using as a key the information (for example, the barcode number) received from the terminal apparatus 100 (the acquisition unit 105) thereby acquiring food information corresponding to the key. The search unit 301 transmits the acquired food information and recommended warming setting to the terminal apparatus 100 (the acquisition unit 105).

The log reception unit 302 receives the user warming log 160 transmitted from the terminal apparatus 100 (the log transmission/reception unit 108). The received user warming log 160 is collected and stored in the database of the user warming log 380. That is, the log reception unit 302 receives the user warming log 160 in which at least the warming time employed by each user in the plurality of users using the microwave oven 200 and the food subjected to the warming are recorded, and the log reception unit 302 stores the user warming log 160 received from each user in the user warming log 380 thereby collecting the user warming log 160 therein.

Furthermore, the log reception unit 302 receives, for example, a user warming log transmitted from a second terminal apparatus (a log transmission/reception unit) connected to a second microwave oven. The received user warming log is collected and stored in the database of the user warming log 380.

The learning unit 303, analyzing the user warming log 380 to learn the setting that allows it to warm a food to a temperature better than can be achieved when the standard warming time is employed. The learning unit 303 stores the warming setting (the learned warming setting) obtained via the learning in the database of the learned warming setting 360. The database of the learned warming setting 360 is managed, for example, in a memory disposed in the server apparatus 300. The memory is, for example, either a RAM or a hard disk or a combination thereof. The learning unit 303 calculates recommended warming times for respective foods based on warming times employed by the plurality of users using the microwave oven 200 and recorded in the user warming log 380, and the learning unit 303 stores the recommended warming times for the respective food in the memory (the database of the learned warming setting 360). For example, the learning unit 303 determines the recommended warming time for each food by the average value of the warming times for the same food recorded in the user warming log 380 provided from the plurality of users.

Note that when the learning unit 303 calculates the recommended warming time, the learning unit 303 may further use the user attribute 370 (that is, data representing each user ID and a corresponding age group to which the user belongs). In this case, the learning unit 303 searches the database of the user attribute 370 using as a key the user ID described in the user warming log 380 to determine an age group corresponding to the user D. The learning unit 303 then calculates the average value of warming times, described in the user warming log 380 collected from the plurality of users, for each food for each age group, and determines the recommended warming time for the food by the calculated average value.

FIG. 3A is a diagram illustrating an example of a database stored in a server apparatus according to an embodiment of the present disclosure. More specifically, FIG. 3A is a diagram illustrating an example of a content of the database in which the food information 350 is stored.

The food information 350 includes data sets each including, for example, as shown in FIG. 3A, a barcode number, a trade name (a food name), a manufacturer, an amount, a standard warming output power, a standard warming time, and the like. For example, the food information 350 is collected separately and stored in the database. The database of the food information 350 is managed, for example, in a memory disposed in the server apparatus 300. The memory disposed in the server apparatus 300 is, for example, either a RAM or a hard disk or a combination thereof.

The learned warming setting 360 is data describing at least foods and corresponding respective optimum warming settings (recommended warming settings) learned by the learning unit 303. Results of learning performed by the learning unit 303 are collected and stored in the database of the learned warming setting 360. The database of the learned warming setting 360 is managed, for example, in a memory disposed in the server apparatus 300. The memory disposed in the server apparatus 300 is, for example, either a RAM or a hard disk or a combination thereof.

FIG. 3B is a diagram illustrating an example of a database stored in a server apparatus according to an embodiment of the present disclosure. More specifically, FIG. 3B is a diagram illustrating an example of a content of the database in which the user attribute 370 is stored.

The user attribute 370 includes data sets each including, for example, as illustrated in FIG. 3B, a user ID, an age group, a gender, an occupation, a family structure, and an area where the user lives. For example, the user attribute 370 is collected separately via questionnaire or the like and stored in a database.

The database of the food information 350 is managed, for example, in a memory disposed in the server apparatus 300. The memory disposed in the server apparatus 300 is, for example, either a RAM or a hard disk or a combination thereof.

FIG. 3C is a diagram illustrating an example of a database stored in a server apparatus according to an embodiment of the present disclosure. More specifically, FIG. 3C is a diagram illustrating an example of a content of the database in which the user warming log 380 is stored.

The user warming log 380 is a log describing which user warmed what amount of which food to what degree (with what wattage for what a time period). The user warming log 380 includes data sets each including, for example, as shown in FIG. 3O, a user ID, a warming start time, a food subjected to warming (for example, a barcode number), an amount of food, a warming output power, and a warming time.

The log reception unit 302 receives the user warming log transmitted from the terminal apparatus 100. The received user warming log 160 is collected and stored in the database of the user warming log 380. Furthermore, the log reception unit 302 receives a user warming log transmitted from a second terminal apparatus 100 connected to the second microwave oven. The received user warming log is collected and stored in the database of the user warming log 380.

The database of the user warming log 380 is managed, for example, in a memory disposed in the server apparatus 300. The memory disposed in the server apparatus 300 is, for example, either a RAM or a hard disk or a combination thereof.

Note that the database of the food information 350, the database of the user attribute 370, the database of the user warming log 380, and the database of the learned warming setting 360 are managed using one or more memories disposed in the server apparatus 300.

Method of Acquiring Warming Setting

Figure 4:
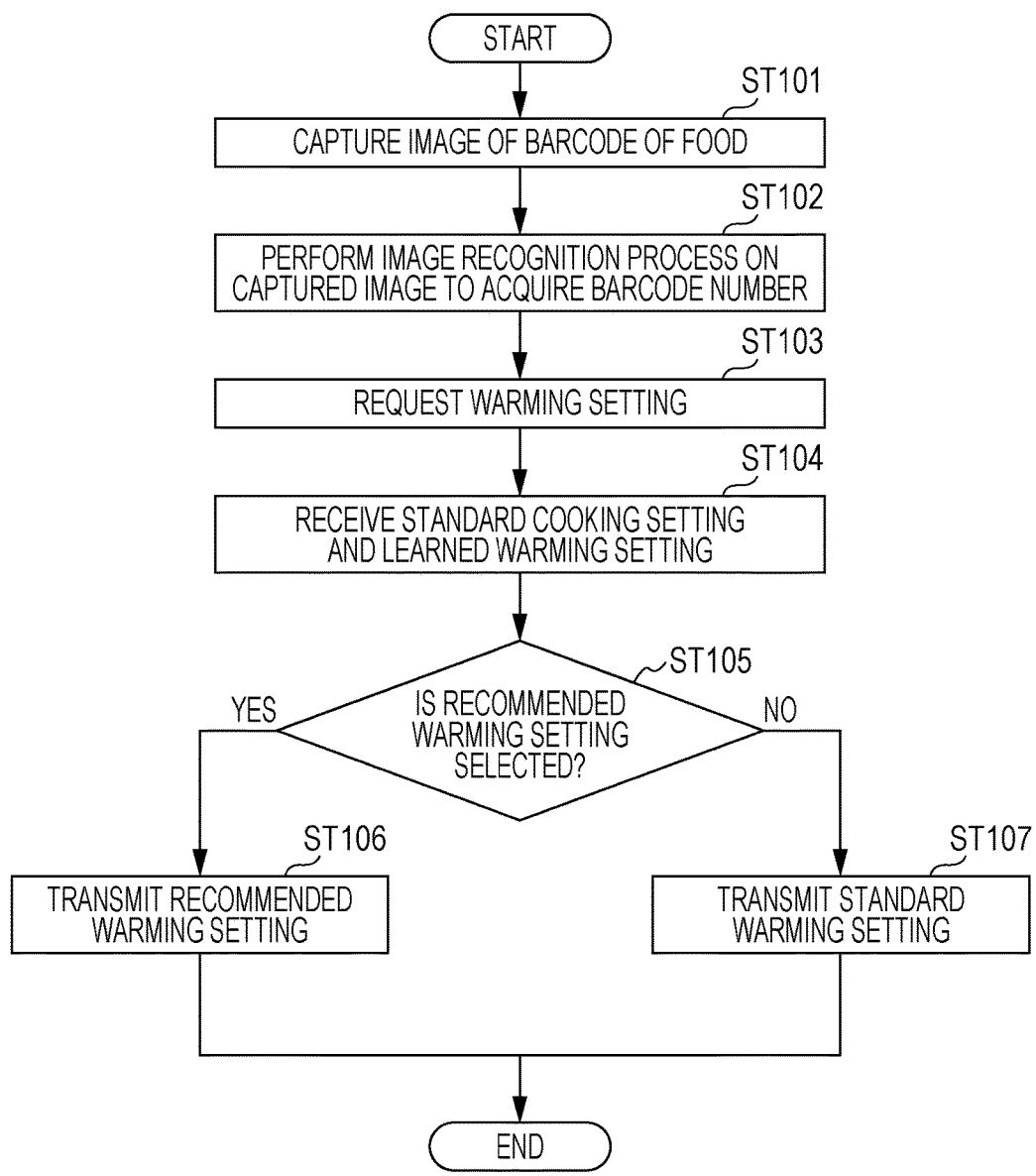
FIG. 4 is a flow chart illustrating an example of a warming setting acquisition process performed by a terminal apparatus according to an embodiment of the present disclosure.

Next, a method of acquiring a warming setting in the terminal apparatus 100 shown in FIG. 2 is described. FIG. 4 is a flow chart illustrating an example of a warming setting acquisition process performed by a terminal apparatus according to an embodiment of the present disclosure.

The flow chart illustrated in FIG. 4 is started, for example, when a user selects to activate a function of recognizing a barcode of a food in the terminal apparatus 100.

In FIG. 4, in step (hereinafter referred to as "ST") 101, the image capture unit 103 captures an image of a barcode of a food.

In ST102, the recognition unit 104 performs an image recognition process on data of the image (the captured image) captured in ST101 thereby acquiring a barcode number.

In ST103, the acquisition unit 105 uploads the barcode number acquired in ST102 and requests the server apparatus 300 to provide a warming setting. Note that in a case where the learned warming setting 360 further includes a recommended warming setting and a corresponding user attribute, the acquisition unit 105 uploads, in ST103, the user ID 150 in addition to the barcode number and requests the server apparatus 300 to provide a warming setting.

In ST104, the acquisition unit 105 receives the warming setting transmitted from the server apparatus 300 in response to the request, issued in ST103, for the warming setting. The warming setting received from the server apparatus 300 includes the recommended warming setting (the learned warming setting) and the standard warming setting (the standard cooking setting). A method of determining, in the server apparatus 300, the recommended warming setting will be described later.

In ST105, the UI generation unit 106 generates a UI 102 that prompts a user to select either the recommended warming setting or the standard warming setting received in ST104. The user selects, on the UI 102, either the recommended warming setting or the standard warming setting.

In a case where the recommended warming setting is selected (YES in ST105), then in ST106 the setting transmission unit 107 transmits the recommended warming setting to the microwave oven 200. On the other hand, in a case where the standard warming setting is selected (NO in ST105), then in ST107 the setting transmission unit 107 transmits the standard warming setting to the microwave oven 200. In this way, the warming setting is set to the microwave oven 200.

Note that in FIG. 4, by way of example, the process of acquiring the warming setting in the terminal apparatus 100 is described. The process of acquiring the warming setting in the second terminal apparatus connected to the second microwave oven is similar to that illustrated in FIG. 4, and thus a further detailed description thereof is omitted.

Method of Uploading Log

Figure 5:
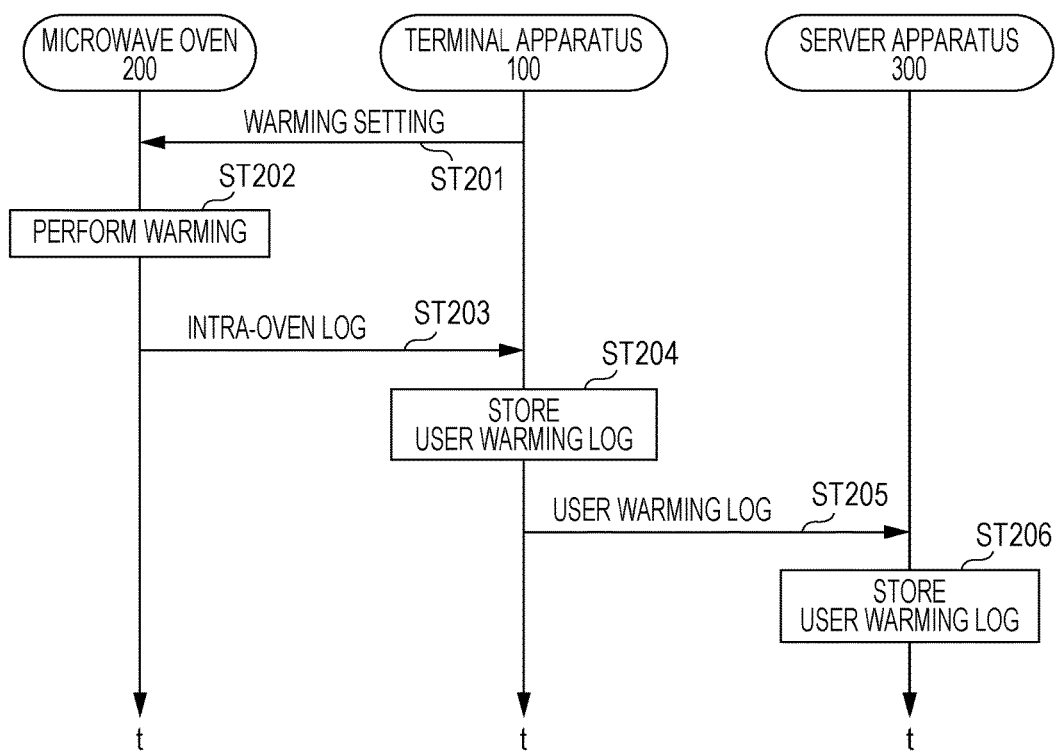
FIG. 5 is a sequence diagram illustrating an example of a process of uploading a user warming log according to an embodiment of the present disclosure.

Next, a process performed until the terminal apparatus 100 shown in FIG. 2 has uploaded the user warming log 160 to the server apparatus 300 is described below. FIG. 5 is a sequence diagram illustrating an example of a process of uploading a user warming log according to an embodiment of the present disclosure. More specifically, FIG. 5 is a sequence diagram illustrating a process performed by the terminal apparatus 100 to upload the user warming log 160 to the server apparatus 300.

In FIG. 5, in ST201, the terminal apparatus 100 (the setting transmission unit 107) transmits the warming setting to the microwave oven 200 (the setting reception unit 201). That is, the process in ST201 corresponds to the process in ST106 or ST107 shown in FIG. 4.

In ST202, the warming unit 202 of the microwave oven 200 performs a warming process according to the warming setting received in ST201.

In ST203, the log transmission unit 204 transmits the intra-oven log 250, in which the content associated with the warming process performed in ST202 is recorded, to the terminal apparatus 100. Note that when the intra-oven log 250 is transmitted to the terminal apparatus 100, a notification of completion of warming may be transmitted to the terminal apparatus 100 to notify that the performing of the warming process in ST202 is completed.

In ST204, the terminal apparatus 100 records the warming process performed in ST202 in the database of the user warming log 160 such that the user ID, the food information, and the intra-oven log 250 are related to each other and combined in a set of data.

In ST205, the log transmission/reception unit 108 of the terminal apparatus 100 uploads the user warming log 160 stored in ST204 to the server apparatus 300 (the log reception unit 302).

In ST206, the log reception unit 302 of the server apparatus 300 stores the user warming log 160, received in ST205 from the terminal apparatus 100, in the database of the user warming log 380.

Thus in the server apparatus 300, the user warming log 160 of each user transmitted from the terminal apparatus 100 is stored in the database of the user warming log 380.

In FIG. 5, by way of example, the process performed by the terminal apparatus 100 to upload a user warming log is described. Note that the second terminal apparatus connected to the second microwave oven may perform a process of uploading a user warming log in a similar manner as illustrated in FIG. 5, although a further detailed description thereof is omitted.

Thus, in the server apparatus 300, user warming logs of respective users transmitted from the second terminal apparatus connected to the second microwave oven are collected and stored in the database of the user warming log 380.

In a case where the terminal apparatus 100 receives the intra-oven log 250 or the notification of completion of warming from the microwave oven 200, for example, in ST203, the terminal apparatus 100 may generate a UI that prompts a user to select whether an additional warming process is to be performed or not. For example, in a case where user warming logs 160 from a plurality of users are not sufficiently collected in the server apparatus 300, there is a possibility that there is only a standard warming time available to be provided as a warming time to users. In this case, the terminal apparatus 100 may display the UI to prompt a user to select whether an additional warming process is to be performed or not. In a case where the user selects that an additional warming process is to be performed, the terminal apparatus 100 may instruct the microwave oven 200 to perform the additional warming process. In the case where the additional warming process is performed, the terminal apparatus 100 and the microwave oven 200 perform, for example, the process from ST201 to ST203 as many times as the number of times the additional warming process is performed. Furthermore, in this case, the terminal 100 records the total time, that is, the sum of the originally-set warming time (the first-time warming time) and the added warming time (the sum of warming times spent for the second time and thereafter). In a case where it is determined that no additional warming process is necessary, the terminal 100 may upload the total warming time of the corresponding warming process as the warming time in the user warming log 160 (that is, the warming time shown in FIG. 3C) to the server apparatus 300.

Learning Process

Figure 6:
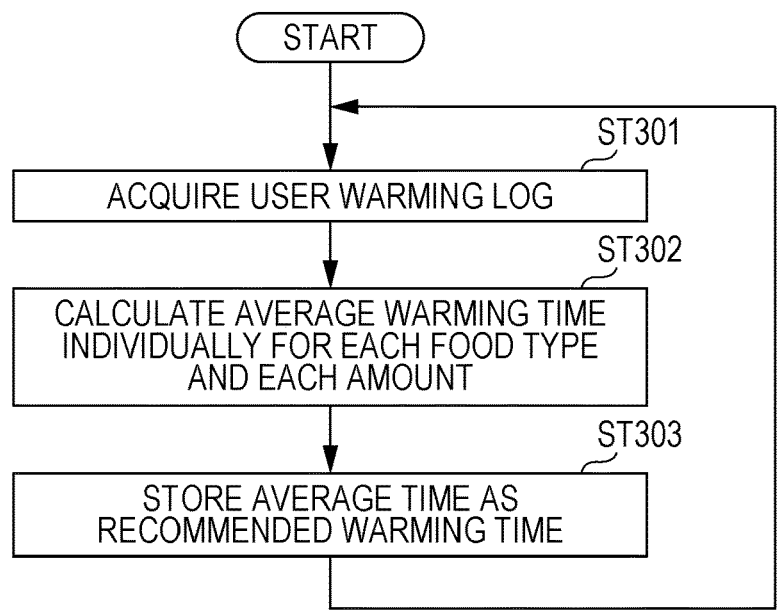
FIG. 6 is a flow chart illustrating an example of a learning process in a server apparatus according to an embodiment of the present disclosure.

Next, a learning process performed by the learning unit 303 of the server apparatus 300 is described. FIG. 6 is a flow chart illustrating an example of a learning process in a server apparatus according to an embodiment of the present disclosure. More specifically, FIG. 6 is a flow chart illustrating a flow of the learning process performed by the learning unit 303.

In FIG. 6, in ST301, the learning unit 303, acquires the user warming log 380 stored in the database. In a case where, for example, the intra-oven log associated with each microwave oven included in the user warming log 380 includes attribute information of the corresponding microwave oven, then, in the acquisition, logs with the same or similar attribute information may be extracted. The attribute information of the microwave oven may include, for example, information indicating a model number of the microwave oven or information indicating a manufacturer of the microwave oven.

In ST302, the learning unit 303 analyzes the user warming log 380 acquired in ST301. For example, the learning unit 302 performs the analysis in terms of types of foods and the number of foods and calculates the average warming time for each combination of the type of food and the number of foods described in the user warming log 380.

For example, in the user warming log 380 shown in FIG. 3C, the learning unit 303 calculates the average warming time for each group of users with the same barcode number and the same amount. That is, the learning unit 303 learns the recommended warming time for each food (for each type of food) for the same amount.

In a case where it is desired to calculate the average value for microwave ovens having the same or similar attribute information selected from the microwave ovens described in the intra-oven log included in the user warming log 380 used in the calculation of the average value, then user warming logs including intra-oven logs of microwave ovens having the same or similar attribute information may be extracted in ST301, and ST302 may be performed for the extracted user warming logs.

In ST303, the learning unit 303 stores the average time calculated in ST302 as the recommended warming time (the learned warming setting 360) in the database.

For example, in the learned warming setting 360, items (in the example described above, a type of a food (a barcode number) and the number of foods) grouped into one group when the average time is calculated and a recommended warming time are related to each other and combined as one set of data. Alternatively, in the learned warming setting 360, items (a type of a food, the number of foods), user IDs grouped into one group, and a recommended warming time may be related to each other and combined as one set of data. This allows the search unit 301 to determine the recommended warming time according to the food information (the barcode number, the number of foods) or the user ID described in the database of the learned warming setting 360.

The process in ST303 may be performed, for example, periodically at predetermined fixed time intervals or may be performed each time the user warming log 380 is updated.

Note that the above-described method of calculating the recommended warming time is shown by way of example but not limitation.

(1) For example, the user warming log 380 includes a plurality of logs associated with a user A in terms of a food a, the learning unit 303 may employ the average value of warming times described in the plurality of logs as a log associated with the user A in terms of the food a.

(2) It is predicated that when a user performs cooking for the first time, the standard warming time is employed in the warming setting. In view of the above, when the learning unit 303 calculate the average time, the learning unit 303 may exclude a log that is at the first position of the total number of times the warming was performed (or logs at the first position and following several positions) from the user warming log 380. That is, in this case, the user warming log 380 (or the user warming log 160) includes a description of the total number of times the warming process was performed (or the total usage time).

(3) The learning unit 303 may further use the user attribute 370. For example, the learning unit 303 may learn the warming time for each food individually for each user attribute (for example, an age group, a gender, an occupation, a family structure, an area where the user lives, shown in FIG. 3B) or for each part of the user attribute. For example, based on the user IDs, the learning unit 303 divides the user warming log 380 into groups according to the age group. The learning unit 303 then calculates the average value of warming times for each food for each age group. By determining the average warming time for each age group by using the learning unit 303, it becomes possible to determine a suitable warming time (optimum warmth) for an age group to which a user belongs.

Alternatively, for example, the learning unit 303 may calculate the average value of warming time for each food for each family structure. By determining the average warming time for each family structure using the learning unit 303, for example in a case where a user's family structure includes a child, it becomes possible to determine a suitable warming time (optimum warmth) for the child.

(4) Alternatively, when a recommended warming time is presented to a particular user, the learning unit 303 may calculate the average value of warming times such that warming times described in user's logs with a similar attribute to that of the user in the user warming log 380 are regarded as more important (are weighted), and the learning unit 303 may employ the resultant average value as the recommended warming time. In this case, each time the terminal apparatus 100 (for example, user A) issues a request for the recommended warming time, the learning unit 303 may perform the above-described learning process for the user A thereby updating the learned warming setting 360 (not illustrated).

(5) In a case where the user warming log 380 includes cooking history associated with a particular user describing that warming processes were performed to obtain rather high temperature regardless of types of foods, the learning unit 303 may set the warming time for this user so as to be considerably longer.

For example, the learning unit 303 compares a warming time for a particular food described in the user warming log 380 with the standard warming time for the same food described in the food information 350, and the learning unit 303 determines the ratio of the actual warming time to the standard warming time. For example, the learning unit 303 may determine the ratio of the actual warming time to the standard warming time for the particular user ID and for each log, and, depending on the average value (tendency) of ratios, the learning unit 303 may determine a changing ratio of the warming time to be employed for this user ID. Herein, the increasing ratio is, for example, a ratio of the changed time relative to the standard warming time, and thus the recommended warming time for this user is calculated by multiplying the warming time by the changing ratio. For example, in a case where the changing ratio is greater than 1 (100%), the warming time is longer than the reference warming time. In a case where the changing ratio is smaller than 1 (100%), the warming time is shorter than the reference warming time.

In the manner as described above, based on the history of the cooking time of each user, the learning unit 303 may learn the tendency of the warming time for the user. This makes it possible to present a warming time such that, for example, when the warming time employed by the user A tends to be longer, a warming time increased so as to be longer than the recommended warming time (for example, the average values of warming times of all users) is presented to the user A. That is, it is possible to provide a warming time that is more suitable for each user than the recommended warming time determined based on the warming times of all users.

(6) The calculation by the learning unit 303 is not limited to the calculation of the average warming time, but the learning unit 303 may employ other methods such as a calculation of an intermediate value.

Determining Warming Setting

Figure 7:
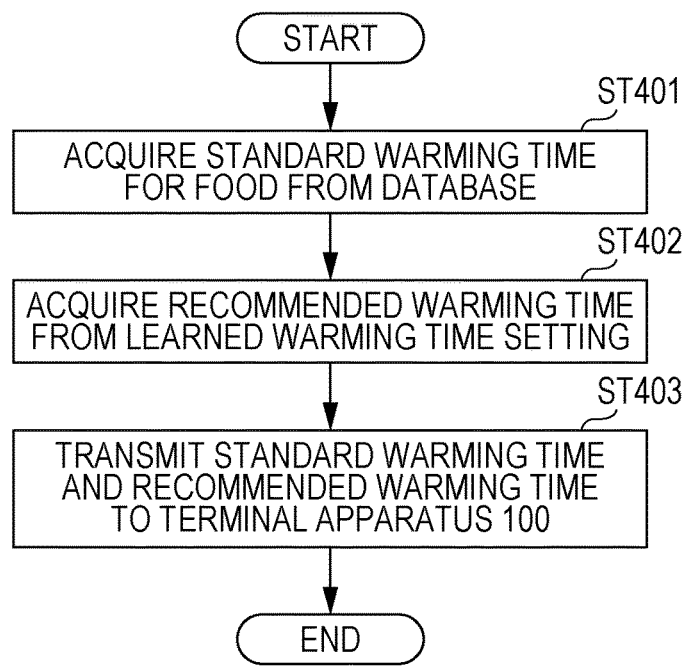
FIG. 7 is a flow chart illustrating an example of a process of determining a recommended warming time by a server apparatus according to an embodiment of the present disclosure.

Next, a method of determining the warming setting by the server apparatus 300 is described below in detail. FIG. 7 is a flow chart illustrating an example of a process of determining the recommended warming time by a server apparatus according to an embodiment of the present disclosure. The flow chart shown in FIG. 7 is started, for example, when the terminal apparatus 100 request the server apparatus 300 to provide a warming setting.

In ST401, the search unit 301 searches the database of the food information 350 (FIG. 3A) using, as a key, food information (a barcode number) transmitted from the terminal apparatus 100 to acquire a warming time (a standard warming setting) for a food corresponding to the barcode number given as the key.

In ST402, the search unit 301 searches the database of the learned warming setting 360 (not illustrated) using, as a key, the food information (the barcode number) or a user ID 150 transmitted from the terminal apparatus 100 to acquire a recommended warming time corresponding to the key.

In ST403, the search unit 301 transmits the standard warming time acquired in ST401 and the recommended warming time acquired in ST402 to the terminal apparatus 100 (the acquisition unit 105).

Alternatively, in ST403, in addition to the recommended warming time for the user ID 150, the search unit 301 may transmit, to the terminal apparatus 100, as reference information for the user, actual warming times employed by other users or recommended warming times presented for other users.

Displaying UI 102

Next, examples of displaying the UI 102 to prompt a user to select a warming time are described.

First Example of Displaying

Figure 8A:
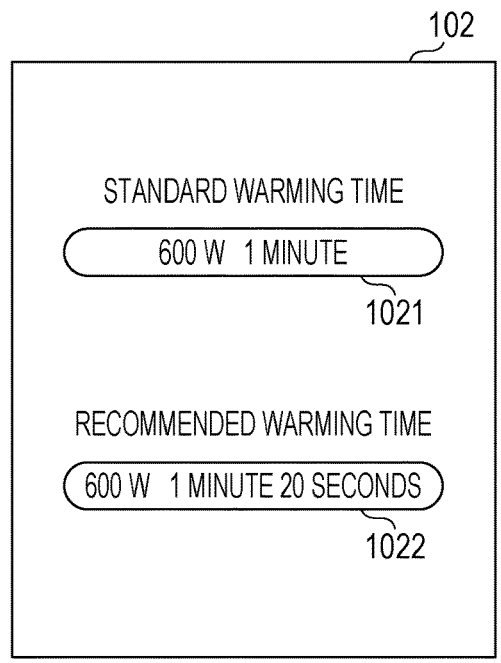
FIG. 8A is a diagram illustrating an example of a UI according to an embodiment of the present disclosure.

FIG. 8A is a diagram illustrating an example of a UI according to an embodiment of the present disclosure.

To display a display screen shown in FIG. 8A, for example, the terminal apparatus 100, the microwave oven 200, and the server apparatus 300 perform a following process. For example, the terminal apparatus 100 (the acquisition unit 105) uploads food information (a barcode number) associated with a food to be warmed and acquires the standard warming time and the recommended warming time for the food to be warmed from the server apparatus 300.

The UI generation unit 106 generates a UI 102 that prompts a user to select either the standard warming time or the recommended warming time. The display/input unit 101 displays the standard warming time and the recommended warming time on a display of the terminal apparatus 100.

For example, as shown in FIG. 8A, the UI 102 includes a selection region 1021 for the standard warming time (1 minute in the example illustrated in FIG. 8A) and a selection region 1022 for the recommended warming time (1 minute 20 seconds in the example illustrated in FIG. 8A). The selection region 1021 and the selection region 1022 are, for example, button icons. A user selects a region corresponding to a desired warming time on the UI 102 illustrated in FIG. 8A, for example, by performing a touching operation (for example, ST105 shown in FIG. 4).

When selecting the selection region 1021 by a touch operation on the UI 102 is detected, the terminal apparatus 100 (the setting transmission unit 107) outputs a setting command to a microwave oven to perform the warming setting (output power of 600 W and warming time of 1 minute in the example shown in FIG. 8A) corresponding to the selection region 1021.

On the other hand, when selecting the selection region 1022 by an input operation on the UI 102 is detected, the terminal apparatus 100 (the setting transmission unit 107) outputs a setting command to the microwave oven to perform the warming setting (output power of 600 W and warming time of 1 minute 20 seconds in the example shown in FIG. 8A) corresponding to the selection region 1022.

The microwave oven 200 executes the received setting command to make the setting corresponding to the selection region 1021. The microwave oven 200 then performs the warming process according to the warming setting selected by the user.

Thus the user is allowed to select the recommended warming time for the food to be warmed, which makes it possible to warm the food to an optimum temperature without performing an additional warming process with the microwave oven 200.

Alternatively, the terminal apparatus 100 may acquire only the recommended warming time without acquiring the standard warming time, and the terminal apparatus 100 may display only the recommended warming time on the UI 102.

Second Example of Displaying

Figure 8B:
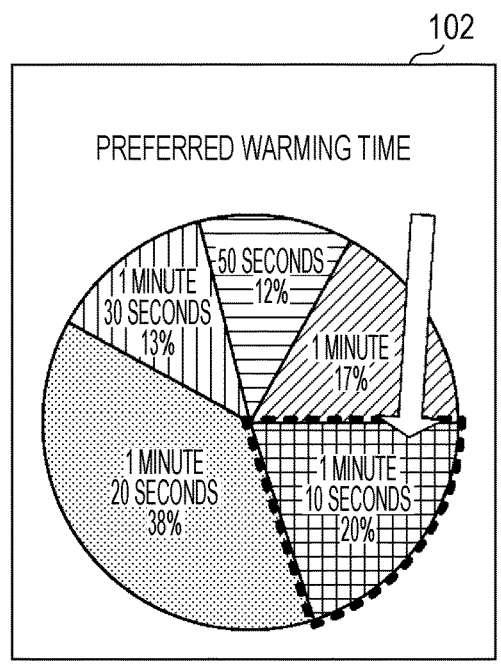
FIG. 8B is a diagram illustrating an example of a UI according to an embodiment of the present disclosure.

FIG. 8B is a diagram illustrating an example of a UI according to an embodiment of the present disclosure.

To display a display screen shown in FIG. 8B, the terminal apparatus 100, the microwave oven 200, and the server apparatus 300 perform a following process. For example, the terminal apparatus 100 (the acquisition unit 105) uploads food information (a barcode number) associated with a food to be warmed and acquires the recommended warming time for the food to be warmed and information representing a distribution of warming times of all users for the food to be warmed from the server apparatus 300.

The UI generation unit 106 generates the UI 102 that displays the distribution of warming times of all users, and a location of a recommended warming time for a user 150 (for example, the average value of warming times of all users) in the distribution of warming times of all users. The display/input unit 101 displays the distribution of warming times of all users and the region of the recommended warming time in this distribution on the display of the terminal apparatus 100.

For example, in the UI 102 shown in FIG. 8B, the distribution of warming times of all users is represented in the form of a circle graph. In the UI 102 shown in FIG. 8B, it is shown that warming times for a certain food are selected such that 50 seconds is employed by 12% of all users, 1 minute by 17% of all users, 1 minute 10 seconds by 20% of all users, 1 minute 20 seconds by 38% of all users, and 1 minute 30 seconds by 13% of all users. Note that the form in which the distribution of warming times of users is displayed on the UI 102 on the display of the terminal apparatus 100 is not limited to the circle graph, but other forms such as a bar graph may be used.

Furthermore, in the UI 102 illustrated in FIG. 8B, it is shown that the recommended warming time for the food to be warmed is in a group of 1 minute 10 seconds (a region surrounded by a dotted line).

For example, a user selects a region corresponding to a desired warming time on the UI 102 illustrated in FIG. 8B, for example, by performing a touching operation. The region corresponding to a warming time is, for example, a region representing a ratio of an area occupying in the circle graph relative to the total area of the circle graph, for each recommended warming time. The terminal apparatus 100 detects a region selected by a touch operation, and determines that a warming time corresponding to the detected region is a warming time selected by the user.

The terminal apparatus 100 (the setting transmission unit 107) transmits a setting command to the microwave oven 200 to perform the warming setting including the selected warming time. The microwave oven 200 executes the setting command to perform the warming setting, and performs the warming process according to the warming setting.

As described above, the terminal apparatus 100 provides the recommended warming time for the food to be warmed to the user, and also displays a tendency of warming times employed by other users on the display. Thus the user is allowed to get to know not only the recommended warming time but also the tendency of warming times employed by other users for the food to be warmed, and thus the user is allowed to select a warming time according to the user's preference.

Third Example of Displaying

Figure 8C:
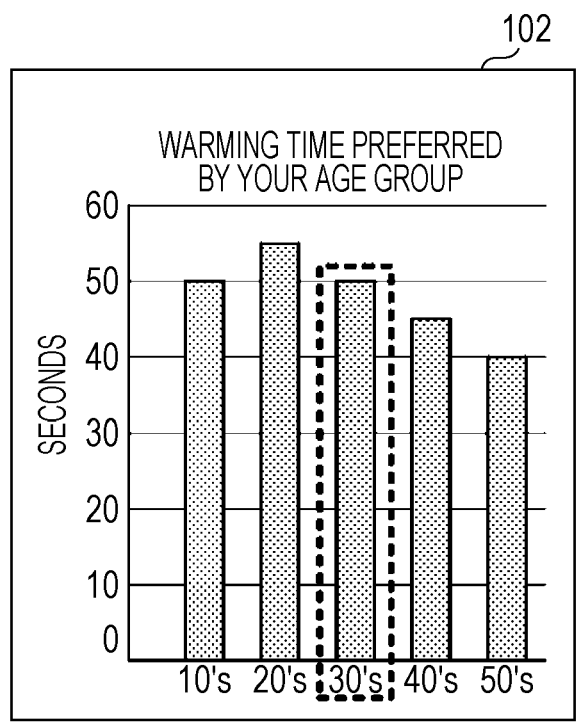
FIG. 8C is a diagram illustrating an example of a UI according to an embodiment of the present disclosure.

FIG. 8C is a diagram illustrating an example of a UI according to an embodiment of the present disclosure.

To display a display screen shown in FIG. 8C, for example, the terminal apparatus 100, the microwave oven 200, and the server apparatus 300 perform a following process. For example, the server apparatus 300 (the learning unit 303) groups logs included in the user warming log 380 into groups according to the age group described in the user attribute 370, and learns recommended warming times for the respective age groups. That is, the learning unit 303 calculates recommended warming times for respective foods for respective age groups based on warming times employed by a plurality of users using the microwave oven and recorded in the user warming log 380.

The terminal apparatus 100 (the acquisition unit 105) uploads food information (a barcode number) associated with a food to be warmed and a user ID 150.

The terminal apparatus 100 acquires, from the server apparatus 300, a recommended warming time corresponding to an age group related to the user ID 150 and a food (a barcode number) to be warmed.

The terminal apparatus 100 also acquires, from the server apparatus 300, information indicating recommended warming times for respective age groups of all users for the food (the barcode number) to be warmed.

For example, the UI generation unit 106 generates a UI 102 that displays a graph representing recommended warming times for respective age groups and a region of a recommended warming time for an age group to which a user of the terminal apparatus 100 belongs. That is, the display/input unit 101 displays the recommended warming times for the respective age groups and the region of the recommended warming time for the age group to which the user of the terminal 100 belongs on the display of the terminal apparatus 100.

For example, in the UI 102 shown in FIG. 8C, recommended warming times for a particular food are represented for respective age groups in the form of a bar graph. The UI 102 illustrated in FIG. 8C shows that a recommended warming time for users of 10's is 50 seconds, a recommended warming time for users of 20's is 55 seconds, a recommended warming time for users of 30's is 50 seconds, a recommended warming time for users of 40's is 45 seconds, and a recommended warming time for users of 50's is 40 seconds.

Furthermore, in the UI 102 illustrated in FIG. 8C, it is displayed on the display that the user of the terminal apparatus 100 belongs to a group of 30's (a region surrounded by a dotted line).

For example, a user selects a selection region corresponding to a desired warming time on the UI 102 illustrated in FIG. 8C, for example, by performing a touching operation. The region corresponding to a warming time is, for example, a region indicating an age group or a region corresponding to an age group in a bar graph. The terminal apparatus 100 detects a region selected by a touch operation, and determines that a warming time corresponding to the detected region is a warming time selected by the user.

The terminal apparatus 100 (the setting transmission unit 107) transmits a setting command to the microwave oven 200 to perform the warming setting including the selected warming time. The microwave oven 200 executes the setting command to perform the warming setting, and performs the warming process according to the warming setting.

As described above, the terminal apparatus 100 provides the recommended warming time for the food to be warmed to the user, and the terminal apparatus 100 also displays recommended warming times for age groups other than the age group to which the user belongs. Thus the user can know warming times for other respective age groups. Thus the user is allowed to, in the setting, select not only a warming time recommended for the user but also a warming time (for example, a recommended warming time for an age group younger than the user) according to a preference of the user.

Note that although in the UI 102 illustrated in FIG. 8C, by way of example, recommended warming times for respective age groups are displayed, recommended warming times may be displayed for respective other user attributes (such as a gender, a family structure, or the like (see FIG. 3B)).

Examples of displaying the UI 102 have been described above.

Although in FIG. 8A to FIG. 8C, the user's selection is detected, by way of example but not limitation, by detecting a touching operation on the UI 102 displayed on the touch-panel display. For example, the terminal apparatus 100 may include a voice recognition unit (not illustrated) that recognizes a content of a voice sensed via a voice sensing unit (not illustrated) such as a microphone or the like. The terminal apparatus 100 may select one cooking time corresponding to the voice recognized by the voice recognition unit from candidates of cooking time including the recommended cooking time displayed on the display. This make it possible to make a selection via a voice.

In FIG. 8A to FIG. 8C, the UI 102 is displayed, by way of example but not limitation, on the touch-panel display. For example, the terminal apparatus 100 may include a voice output unit (not illustrated) such as a speaker or the like, and the voice output unit may output a content in terms of candidates of cooking time including the recommended cooking time.

As described above, according to the present embodiment, the terminal apparatus 100 acquires, from the server apparatus 300, a recommended cooking time corresponding to a food to be warmed by a user of the terminal apparatus 100 from recommended cooking times for respective foods obtained based on cooking times using the microwave oven recorded in the user warming log 380 given from a plurality of users, and the terminal apparatus 100 displays, on the display, the UI 102 that prompts the user to select one warming time from candidates of the warming time including the recommended warming time.

By displaying, on the displaying of the terminal apparatus 100, the recommended warming time learned based on the actual warming times employed by a plurality of users in the above-described manner, it becomes possible to provide a user with a setting for an optimum warming time (a cooking time) before using of the microwave oven 200 is started. That is, according to the present embodiment, it is possible to provide a cooking program for cooking a food to a temperature according to a user's preference without performing additional cooking.

Embodiments of the present disclosure have been described above.

In the embodiments described above, in a case where the microwave oven 200 is capable of being connected to the Internet, the microwave oven 200 may be directly connected to the server apparatus 300 without the intervening terminal apparatus. In this case, for example, the microwave oven 200 may include elements similar to those of the terminal apparatus 100 shown in FIG. 2 and the microwave oven 200 may present a recommended warming setting to a user via the UI 102.

In the embodiments described above, by way of example, a recommended setting for an oven function (warming process) of the microwave oven 200 is provided to a user. However, in the embodiments described above, the function for which the recommended setting is provided is not limited to the oven function. A recommend setting may be provided for may be provided for other functions, for example, an oven function, a grill function, a steam function, or the like.

The embodiments of the present disclosure have been described in detail above with reference to the drawings. Note that functions of the terminal apparatus 100 or the server apparatus 300 may be realized by a computer program.

Figure 9:
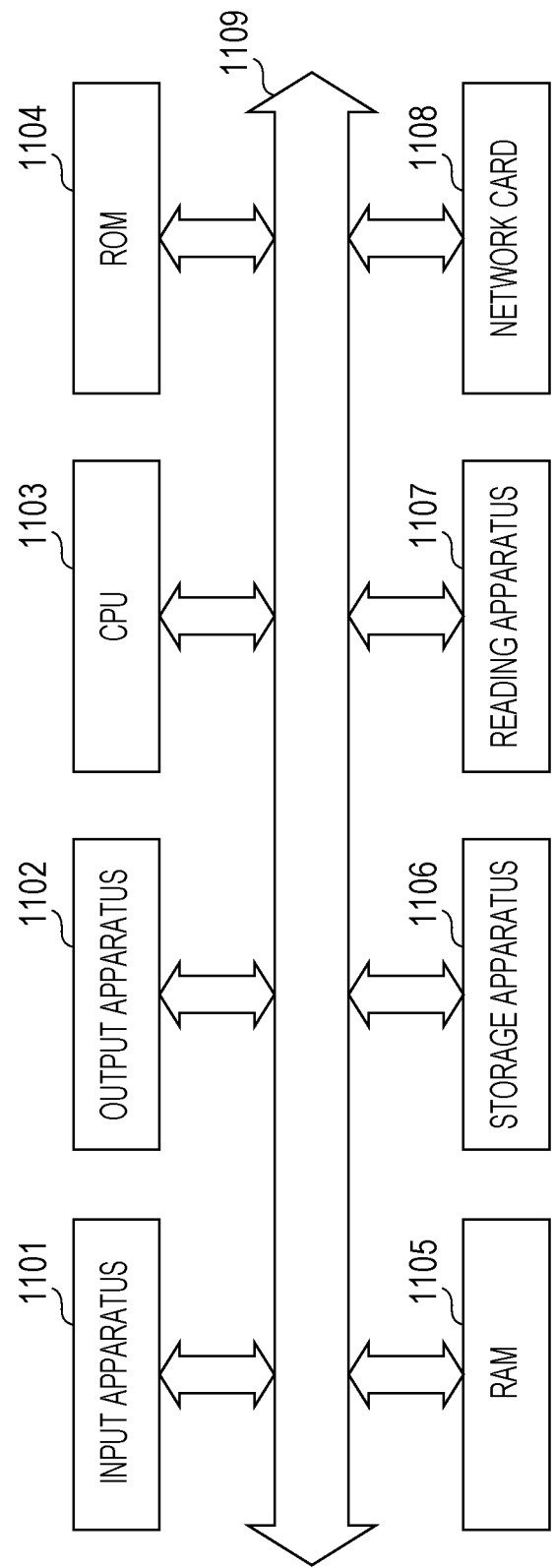
FIG. 9 is a block diagram illustrating an example of a hardware configuration of a computer according to an embodiment of the present disclosure.

FIG. 9 is a block diagram illustrating an example of a hardware configuration of a computer according to an embodiment of the present disclosure.

More specifically, FIG. 9 is a diagram illustrating a hardware configuration of a computer that realizes the functions of each apparatus using a program. This computer 1100 includes an input apparatus 1101 such as a keyboard, a mouse, a touch pad, or the like, an output apparatus 1102 such as a display, a speaker, or the like, a CPU (Central Processing Unit) 1103, a ROM (Read Only Memory) 1104, a RAM (Random Access Memory) 1105, a storage apparatus 1106 such as a hard disk apparatus, an SSD (Solid State Drive) or the like, a reading apparatus 1107 that reads out information from a storage medium such as a DVD-ROM (Digital Versatile Disk Read Only Memory), a USB (Universal Serial Bus)memory, or the like, and a network card 1108 that performs communication via a network, where each unit is connected to each other via a bus 1109.

The reading apparatus 1107 reads the program from the storage medium in which the program for realizing the functions of each apparatus is stored, and the reading apparatus 1107 stores the program in the storage apparatus 1106, or the network card 1108 communicates with a server apparatus connected to the network to download the program for realizing the functions of each apparatus and stores the downloaded program in the storage apparatus 1106.

The CPU 1103 copies the program stored in the storage apparatus 1106 into the RAM 1105, and sequentially reads out instructions included in the program from the RAM 1105 and executes them thereby realizing the functions of each apparatus.

The techniques described in the aspects may be realized in various models of cloud services as described below. However, the models in which the techniques in the aspects can be realized are not to those described below.

Service Model 1: In-House Data Center Model

Figure 10:
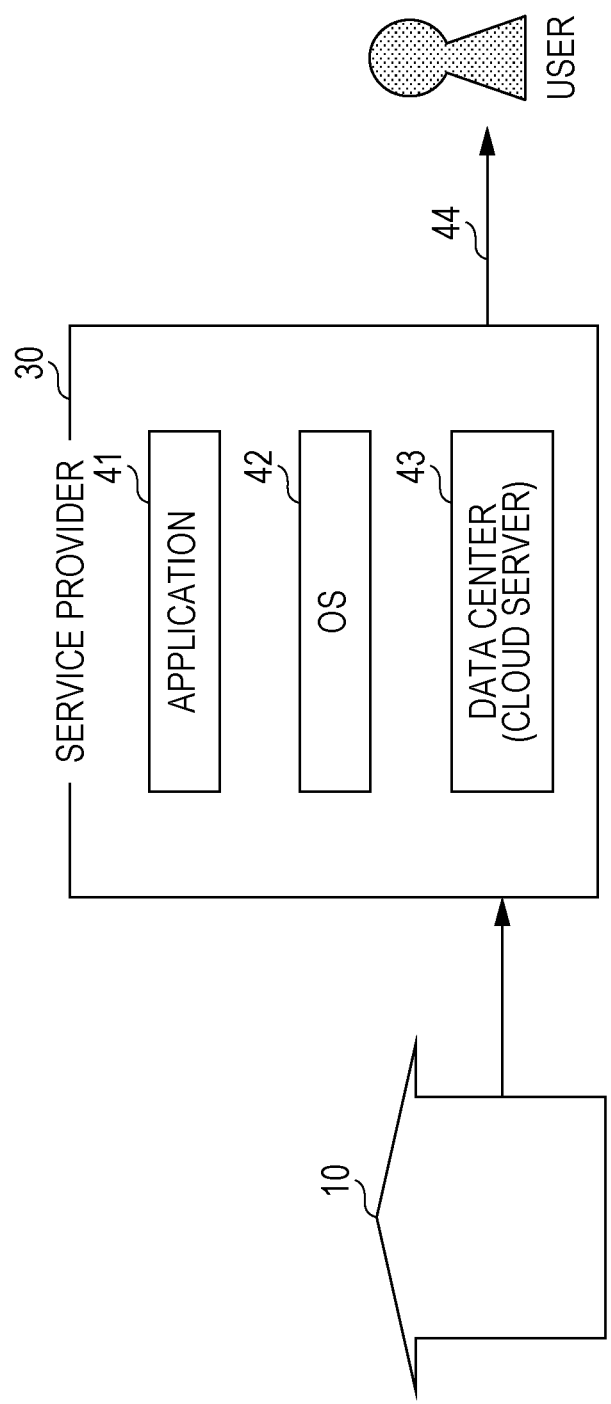
FIG. 10 is a diagram illustrating an example of a cloud service of model 1 according to an embodiment of the present disclosure.

FIG. 10 is a diagram illustrating an example of a cloud service of model 1 (an in-house data center model) according to an embodiment of the present disclosure. In this model, a service provider 30 acquires information from group 10 and provides service to users. In this model, the service provider 30 has a function of a data center operation company. That is, the service provider has a cloud server 21 that manages big data. Therefore, there is no data center operation company.

In this model, the service provider 30 operates and manages a data center (a cloud server 21) (43). The service provider 30 also manages an OS (42) and an application (41). The service provider 30 provides service (44) using the OS (42) and the application (41) managed by the service provider 30.

Service Model 2: Model Using IaaS

Figure 11:
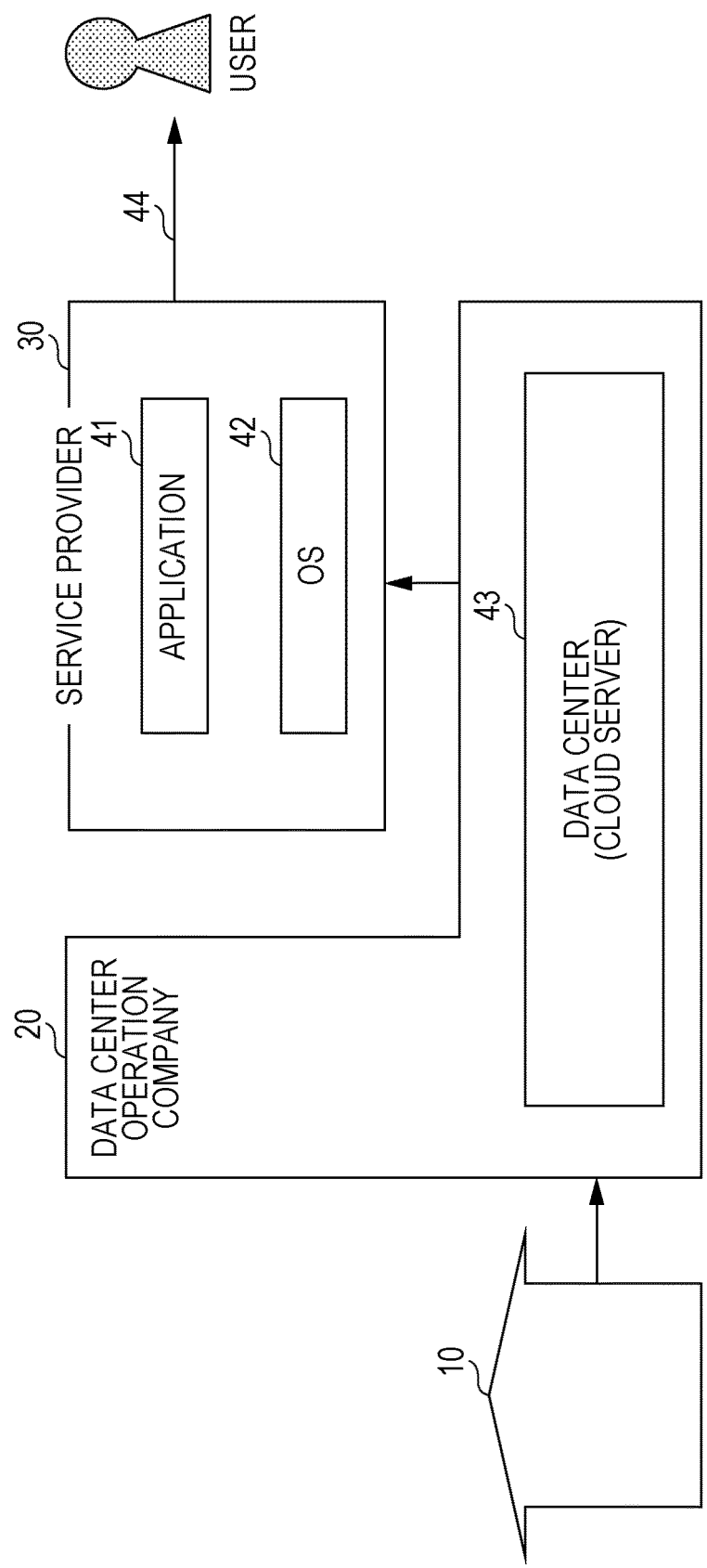
FIG. 11 is a diagram illustrating an example of a cloud service of model 2 according to an embodiment of the present disclosure.

FIG. 11 is a diagram illustrating an example of a cloud service of model 2 (a model using IaaS) according to an embodiment of the present disclosure. Herein IaaS stands for infrastructure as a service, which is a cloud service model that provides a base itself in terms of building a computer system and operating it as a service provided via the Internet.

In this model, the data center operation company 20 operates and manages (43) the data center (the cloud server 21). The service provider 30 manages the OS (42) and the application (41). The service provider 30 provides service (44) by using the OS (42) and the application (41) managed by the service provider 30.

Service Model 3: Model Using PaaS

Figure 12:
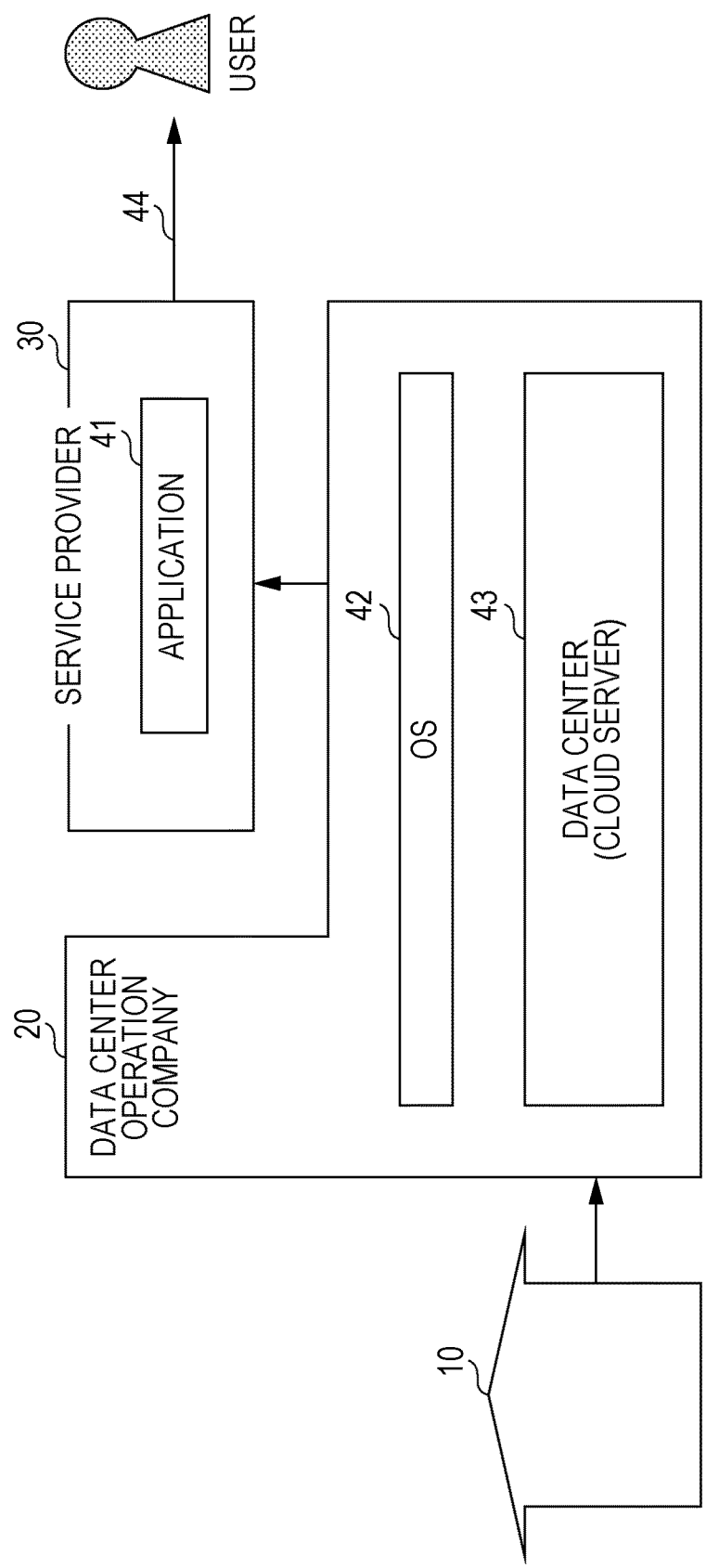
FIG. 12 is a diagram illustrating an example of a cloud service of model 3 according to an embodiment of the present disclosure.

FIG. 12 is a diagram illustrating an example of a cloud service of model 3 (a model using PaaS) according to an embodiment of the present disclosure. Herein PaaS stands for platform as a service, which is a cloud service model that provides a platform which is a base of building software and operating it as a service provided via the Internet.

In this model, the data center operation company 20 manages the OS (42), and operates and manages (43) the data center (the cloud server 21). The service provider 30 manages the application (41). The service provider 30 provides service (44) by using the OS (42) managed by the data center operation company 20 and using the application (41) managed by the service provider 30.

Service Model 4: Model Using SaaS

FIG. 13 is a diagram illustrating an example of a cloud service of model 4 (a model using SaaS) according to an embodiment of the present disclosure. Herein SaaS stands for software as a service. In this cloud service providing model, for example, an application provided by a platform provider having a data center (cloud server) is allowed to be used by a company or an individual (user) having no data center (cloud server) via a network such as the Internet.

In this model, the data center operation company 20 manages the application (41) and the OS (42) and operates and manages (43) the data center (the cloud server 21). The service provider 30 provides service (44) by using the OS (42) and the application (41) managed by the data center operation company 20.

In any model described above, it is assumed that the service provider 30 provides service. Note that the service provider or the data center operation company may develop an OS, an application, or a big-data database, or may request a third party to perform the development.

The present disclosure is useful as a control method of control a cooking device, a storage medium, and an information providing method in a terminal apparatus and an information providing system.

What is claimed is:

1. A control method of controlling a terminal apparatus connected to a server and a first cooking device from among a plurality of cooking devices, the terminal apparatus including a processor, the server including a memory that stores a plurality of user logs, each of the user logs including (i) food information indicating a food subject to cooking in a cooking device used by a user from among a plurality of users and (ii) a cooking time set in the cooking device by the user for cooking the food indicated by the food information, the control method comprising:

acquiring, from the server using the processor, a recommended cooking time corresponding to a food of a first user to be cooked, the recommended cooking time being calculated by the server based on the cooking time included in at least two of the user logs stored in the memory in which the food information indicates the same food as the food of the first user to be cooked;

generating, using the processor, one or more icons including a first icon corresponding to the recommended cooking time;

displaying, on a display screen using the processor, a user interface that prompts the first user to select one of the one or more icons; and in response to detecting that the first icon corresponding to the recommended cooking time is selected as the one of the one or more icons by an input operation performed on the user interface, outputting, to the first cooking device using the processor, a setting command to set the recommended cooking time corresponding to the first icon, wherein each of the user logs further includes a description of a user ID of the user, wherein the server includes data stored therein describing, for each of the plurality of users, a correspondence between the user ID of the user and an age group of the user, wherein the acquiring includes acquiring, from the server, a plurality of recommended cooking times, one of the recommended cooking times corresponding to the food of the first user to be cooked and being recommended for an age group related to a user ID of the first user, and the other recommended cooking times corresponding to the food of the first user to be cooked and being recommended for age groups other that the age group related to the user ID of the first user, wherein, in the generating, the one or more icons includes a second icon corresponding to the one of the recommended cooking times and third icons respectively corresponding the other recommended cooking times, and wherein the control method further comprises:

in response to detecting that the second icon corresponding to the one of the recommended cooking times is selected as the one of the one or more icons by an input operation performed on the user interface, outputting, to the first cooking device using the processor, a setting command to set the one of the recommended cooking times corresponding to the second icon; and in response to detecting that one of the third icons corresponding to one of the other recommended cooking times is selected as the one of the one or more icons by an input operation performed on the user interface, outputting, to the first cooking device using the processor, a setting command to set the one of the other recommended cooking times corresponding to the one of the third icons.

2. The control method according to claim 1, wherein the acquiring includes acquiring, from the server, a standard cooking time corresponding to the food of the first user to be cooked, wherein, in the generating, the one or more icons includes a second icon corresponding to the standard cooking time, and wherein the control method further comprises in response to detecting that the second icon corresponding to the standard cooking time is selected as the one of the one or more icons by an input operation performed on the user interface, outputting, to the first cooking device using the processor, a setting command to set the standard cooking time corresponding to the second icon.

3. The control method according to claim 1, wherein the acquiring includes acquiring, from the server, a distribution of cooking times employed by the plurality of users for the food of the first user to be cooked, wherein the generating includes generating a graph of the distribution of the cooking times, which includes, as the first icon, a region of the recommended cooking time, wherein in the displaying, the graph of the distribution is displayed as the user interface, and wherein the control method further comprises in response to detecting that the region of the recommended cooking time is selected by an input operation performed on the user interface, outputting, to the first cooking device using the processor, a setting command to set the recommended cooking time corresponding to the selected region of the recommended cooking time.

4. The control method according to claim 1, wherein the recommended cooking time is an average value of cooking times for the same food as the food of the first user to be cooked.

5. The control method according to claim 1, wherein the recommended cooking time is an average value of cooking times for the same food as the food of the first user to be cooked for the respective age groups described in the user log from the plurality of users.

6. A non-transitory storage medium storing a program of controlling a server and a terminal apparatus connected to a first cooking device from among a plurality of cooking devices, the terminal device including a processor, the server including a memory that stores two or more user logs, each of the user logs including (i) food information indicating a food subject to cooking in a cooking device used by a user from among a plurality of users and (ii) a cooking time set in the cooking device by the user for cooking the food indicated by the food information, the program causing the processor to execute:

acquiring from the server, a recommended cooking time corresponding to a food of the first user to be cooked, the recommended cooking time being calculated by the server based on the cooking time included in at least two of the user logs stored in the memory in which the food information indicates the same food as the food of the first user to be cooked;

generating one or more icons including a first icon corresponding to the recommended cooking time;

displaying, on a display screen, a user interface that prompts the first user to select one of the one or more icons; and in response to detecting that the first icon corresponding to the recommended cooking time is selected as the one or the one or more icons by an input operation performed on the user interface, outputting, to the first cooking devices a setting command to set the recommended cooking time corresponding to the first icon, wherein each of the user logs further includes a description of a user ID of the user, wherein the server includes data stored therein describing, for each of the plurality of users, a correspondence between the user ID of the user and an age group of the user, wherein the acquiring includes acquiring, from the server, a plurality of recommended cooking times, one of the recommended cooking times corresponding to the food of the first user to be cooked and being recommended for an age group related to a user ID of the first user, and the other recommended cooking times corresponding to the food of the first user to be cooked and being recommended for age groups other that the age group related to the user ID of the first user, wherein, in the generating, the one or more icons includes a second icon corresponding to the one of the recommended cooking times and third icons respectively corresponding the other recommended cooking times, and wherein the control method further comprises:

in response to detecting that the second icon corresponding to the one of the recommended cooking times is selected as the one of the one or more icons by an input operation performed on the user interface, outputting, to the first cooking device using the processor, a setting command to set the one of the recommended cooking times corresponding to the second icon; and in response to detecting that one of the third icons corresponding to one of the other recommended cooking times is selected as the one of the one or more icons by an input operation performed on the user interface, outputting, to the first cooking device using the processor, a setting command to set the one of the other recommended cooking times corresponding to the one of the third icons.

7. A terminal apparatus connected to a server and a first cooking device from among a plurality of cooking devices, the server including a memory that stores two or more user logs, each of the user logs including (i) food information indicating a food subject to cooking in a cooking device used by a user from among a plurality of users and (ii) a cooking time set in the cooking device by the user for cooking the food indicated by the food information, the terminal apparatus comprising:

a processor; and a non-transitory memory storing thereon a program, which when executed, causes the processor to perform:

acquiring, from the server, a recommended cooking time corresponding to a food of a first user to be cooked, the recommended cooking time being calculated by the server based on the cooking time included in at least two of the user logs stored in the memory in which the food information indicates the same food as the food of the first user to be cooked;

generating one or more icons including a first icon corresponding to the recommended cooking time;

displaying, on a display screen, a user interface that prompts the first user to select one of the one or more icons; and in response to detecting that the first icon corresponding to the recommended cooking time is selected as the one of the one or more icons by an input operation performed on the user interface, outputting, to the first cooking device using the processor, a setting command to set the recommended cooking time corresponding to the first icon, wherein each of the user logs further includes a description of a user ID of the user, wherein the server includes data stored therein describing, for each of the plurality of users, a correspondence between the user ID of the user and an age group of the user, wherein the acquiring includes acquiring, from the server, a plurality of recommended cooking times, one of the recommended cooking times corresponding to the food of the first user to be cooked and being recommended for an age group related to a user ID of the first user, and the other recommended cooking times corresponding to the food of the first user to be cooked and being recommended for age groups other that the age group related to the user ID of the first user, wherein, in the generating, the one or more icons includes a second icon corresponding to the one of the recommended cooking times and third icons respectively corresponding the other recommended cooking times, and wherein the control method further comprises:

in response to detecting that the second icon corresponding to the one of the recommended cooking times is selected as the one of the one or more icons by an input operation performed on the user interface, outputting, to the first cooking device using the processor, a setting command to set the one of the recommended cooking times corresponding to the second icon; and in response to detecting that one of the third icons corresponding to one of the other recommended cooking times is selected as the one of the one or more icons by an input operation performed on the user interface, outputting, to the first cooking device using the processor, a setting command to set the one of the other recommended cooking times corresponding to the one of the third icons.

8. An information providing method performed by a server that is connected via a network to a plurality of terminal apparatuses connected to different cooking devices, the server including a processor and a memory that stores two or more user logs, each of the user logs including (i) food information indicating a food subject to cooking in a cooking device used by a user from among a plurality of users and (ii) a cooking time set in the cooking device by the user for cooking the food indicated by the food information, the method comprising:

calculating, using the processor, a recommended cooking time corresponding to a food of a first user to be cooked, the recommended cooking time being calculated based on the cooking time included in at least two of the user logs stored in the memory in which the food information indicates the same food as the food of the first user to be cooked; and outputting, to a first terminal apparatus using the processor, the recommended cooking time to cause the first terminal apparatus to (i) generate one or more icons including a first icon corresponding to the recommended cooking time and (ii) displaying, on a display screen, a user interface that prompts the first user to select one of the one or more icons; and wherein the first terminal apparatus is used by the first user from among the plurality of terminal apparatuses, wherein each of the user logs further includes a description of a user ID of the user, wherein the server includes data stored therein describing, for each of the plurality of users, a correspondence between the user ID of the user and an age group of the user, wherein (i) the calculating includes calculating a plurality of recommended cooking times, one of the recommended cooking times corresponding to the food of the first user to be cooked and being recommended for an age group related to a user ID of the first user, and the other recommended cooking times corresponding to the food of the first user to be cooked and being recommended for age groups other that the age group related to the user ID of the first user, and (ii) the outputting includes outputting the recommended cooking times, wherein the one or more icons includes a second icon corresponding to the one of the recommended cooking times and third icons respectively corresponding the other recommended cooking times, wherein in response to detecting that the first icon corresponding to the recommended cooking time is selected as the one of the one or more icons by an input operation performed on the user interface, the first terminal apparatus outputs, to the connected cooking, a setting command to set the recommended cooking time corresponding to the first icon, wherein in response to detecting that the second icon corresponding to the one of the recommended cooking times is selected as the one of the one or more icons by an input operation performed on the user interface, the first terminal apparatus outputs, to the connected cooking device, a setting command to set the one of the recommended cooking times corresponding to the second icon, and wherein in response to detecting that one of the third icons corresponding to one of the other recommended cooking times is selected as the one of the one or more icons by an input operation performed on the user interface, the first terminal apparatus outputs, to the connected cooking device, a setting command to set the one of the other recommended cooking times corresponding to the one of the third icons.

* * * * *

UNITED STATES PATENT AND TRADEMARK OFFICE
CERTIFICATE OF CORRECTION

PATENT NO. : 10,282,079 B2
APPLICATION NO. : 15/003296
DATED : May 7, 2019
INVENTOR(S) : Yuki Shinomoto Page 1 of 1

It is certified that error appears in the above-identified patent and that said Letters Patent is hereby corrected as shown below:

In the Claims

In Column 27, Line 40, Claim 6, "devices, the terminal device" should read --devices, the terminal apparatus--;

In Column 28, Line 18, Claim 6, "wherein the control method further comprises:" should read --wherein the program further causes the processor to execute:--;

In Column 28, Line 23, Claim 6, "to the first cooking device using the processor," should read --to the first cooking device,--;

In Column 28, Lines 30 and 31, Claim 6, "to the first cooking device using the processor," should read --to the first cooking device,--;

In Column 29, Line 18, Claim 7, "wherein the control method further comprises:" should read --wherein the control program, which when executed, further causes the processor to perform:--;

In Column 29, Line 23, Claim 7, "to the first cooking device using the processor," should read --to the first cooking device,--;

In Column 29, Lines 30 and 31, Claim 7, "to the first cooking device using the processor," should read --to the first cooking device,--;

In Column 30, Line 3, Claim 8, "and (ii) displaying," should read --and (ii) display,--; and In Column 30, Line 32, Claim 8, "to the connected cooking, a" should read --to the connected cooking device, a--.

Signed and Sealed this
Third Day of September, 2019

Andrei Iancu
*Director of the United States Patent and Trademark Office*